US009886721B2

(12) United States Patent
Ayedun et al.

(10) Patent No.: US 9,886,721 B2
(45) Date of Patent: Feb. 6, 2018

(54) NON-REPUDIATION PROCESS FOR CREDIT APPROVAL AND IDENTITY THEFT PREVENTION

(75) Inventors: Taiwo Ayedun, Kent, WA (US); Jameelah Ayedun, Kent, WA (US)

(73) Assignee: CreditRegistry Corporation, Kent, WA (US)

( * ) Notice: Subject to any disclaimer, the term of this patent is extended or adjusted under 35 U.S.C. 154(b) by 952 days.

(21) Appl. No.: 13/399,356

(22) Filed: Feb. 17, 2012

(65) Prior Publication Data
US 2013/0046693 A1 Feb. 21, 2013

Related U.S. Application Data

(60) Provisional application No. 61/444,617, filed on Feb. 18, 2011.

(51) Int. Cl.
*G06Q 20/00* (2012.01)
*G06Q 40/02* (2012.01)
(Continued)

(52) U.S. Cl.
CPC ............ *G06Q 40/02* (2013.01); *G06Q 20/04* (2013.01); *G06Q 20/10* (2013.01); *G06Q 20/367* (2013.01);
(Continued)

(58) Field of Classification Search
CPC ............ G06Q 20/367; G06Q 20/3674; G06Q 20/382; G06Q 20/04; G06Q 20/10;
(Continued)

(56) References Cited

U.S. PATENT DOCUMENTS 7,921,297 B2 *  4/2011  Ortiz .................. H04L 63/0861
                                                    713/182
7,973,607 B1 *  7/2011  Ciaffi .................... G06F 21/725
                                                    331/16
(Continued)

FOREIGN PATENT DOCUMENTS

WO         WO-03061186 A1 *  7/2003  ............. G06F 21/32

OTHER PUBLICATIONS

International Search Report and Written Opinion for International Patent Application No. PCT/US2012/025688 dated Sep. 27, 2012 (7 pages).

*Primary Examiner* — Kito R Robinson
*Assistant Examiner* — Benjamin S Brindley
(74) *Attorney, Agent, or Firm* — John W. Branch; Lowe Graham Jones PLLC

(57) ABSTRACT

Embodiments are directed towards employing a non-repudiation process for consumer credit requests based on an affirmative authentication of a one-time-pin ("OTP") generated from a consumer biometric smartcard. The biometric smartcard may authenticate biometric information (e.g. fingerprint, facial image, iris image, or the like) of the consumer based on biometric templates stored on the biometric smartcard. In at least some of the various embodiments, the OTP may be authenticated by an identity authority, such that an associated credit request to a provider may be authenticated. In some embodiments, the provider may request and utilize a credit report for an authentic credit request to determine whether or not the consumer has an acceptable credit rating. If the consumer has an acceptable credit rating, then the provider may provide credit to the consumer.

21 Claims, 11 Drawing Sheets

(51) Int. Cl.
  *G06Q 40/00* (2012.01)
  *G06Q 20/40* (2012.01)
  *G06Q 20/36* (2012.01)
  *G06Q 20/38* (2012.01)
  *G06Q 20/04* (2012.01)
  *G06Q 20/10* (2012.01)
  *G07F 7/10* (2006.01)

(52) U.S. Cl.
  CPC ........ *G06Q 20/3674* (2013.01); *G06Q 20/382* (2013.01); *G06Q 20/40* (2013.01); *G06Q 40/00* (2013.01); *G07F 7/1008* (2013.01)

(58) Field of Classification Search
  CPC ........ G06Q 20/40; G06Q 40/00; G06Q 40/02; G07F 7/1008
  USPC .................................................... 705/44, 65
  See application file for complete search history.

(56) References Cited

U.S. PATENT DOCUMENTS

| | | | |
|---|---|---|---|
| 8,316,237 B1* | 11/2012 | Felsher | H04L 9/0825 380/282 |
| 8,827,154 B2* | 9/2014 | Hammad | G06F 21/31 235/380 |
| 9,111,276 B2* | 8/2015 | Haller | G06F 21/62 |
| 9,119,076 B1* | 8/2015 | Gubbi | H04W 12/12 |
| 2005/0044387 A1 | 2/2005 | Ozolins | |
| 2005/0185774 A1* | 8/2005 | Grear | H04L 12/66 379/91.02 |
| 2007/0033139 A1 | 2/2007 | Handler | |
| 2007/0276750 A1* | 11/2007 | Stuart | 705/38 |
| 2008/0141336 A1* | 6/2008 | Haller | G06F 21/62 726/1 |
| 2008/0201265 A1* | 8/2008 | Newton | G06Q 20/04 705/67 |
| 2008/0282334 A1 | 11/2008 | Yves et al. | |
| 2009/0289106 A1* | 11/2009 | Bishop | G06Q 20/02 235/379 |
| 2009/0313129 A1 | 12/2009 | Rothschild | |
| 2010/0095130 A1* | 4/2010 | Bertran | G06Q 20/35765 713/189 |
| 2010/0242102 A1 | 9/2010 | Cross et al. | |
| 2010/0312698 A1* | 12/2010 | Bonalle | G06Q 20/105 705/41 |
| 2011/0224509 A1* | 9/2011 | Fish | A61B 5/0002 600/301 |

* cited by examiner

NON-REPUDIATION PROCESS FOR CREDIT APPROVAL AND IDENTITY THEFT PREVENTION

CROSS-REFERENCE TO RELATED APPLICATIONS

This Application claims the benefit under 35 U.S.C. §119(e) of U.S. Provisional Patent Application Ser. No. 61/444,617 filed on Feb. 18, 2011, which is incorporated herein by reference.

TECHNICAL FIELD

The present invention relates generally to processing of credit transactions, and, more particularly, but not exclusively to enabling a non-repudiation process for approving credit for individuals and preventing identity theft.

BACKGROUND

A consumer that wishes to apply for credit may assert his identity to a provider of credit based services, such as a bank, retailer, utility company, and the like. The consumer may apply for credit by completing a credit application (paper-based or otherwise—via phone, Internet, ATM, short message service ("SMS") or other such useful medium). Along with other relevant information, the consumer typically provides an identifier with which the provider can verify his identity. The identifier can uniquely identify the consumer such as social security number. Also, the identifier can be a transaction number by which the provider can verify the identity of the consumer within the context of a business relationship with the provider for its products and/or services.

The credit application can be completed by the consumer in the provider's presence or it can be completed at an outlet location or through some communication medium where the consumer is not in provider's presence. In the latter case, the completed credit application may be later transported (via any secure or reliable means—electronically, physically or via mail) to the provider. Unfortunately, if the consumer's identity information that is used to apply for credit is stolen, substantial financial losses can result for the consumer and the provider. However, if a consumer's identity was linked to a unique identifier on a credit application form, consumer identity theft could be reduced and a reliable non-repudiation process for credit could be established.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
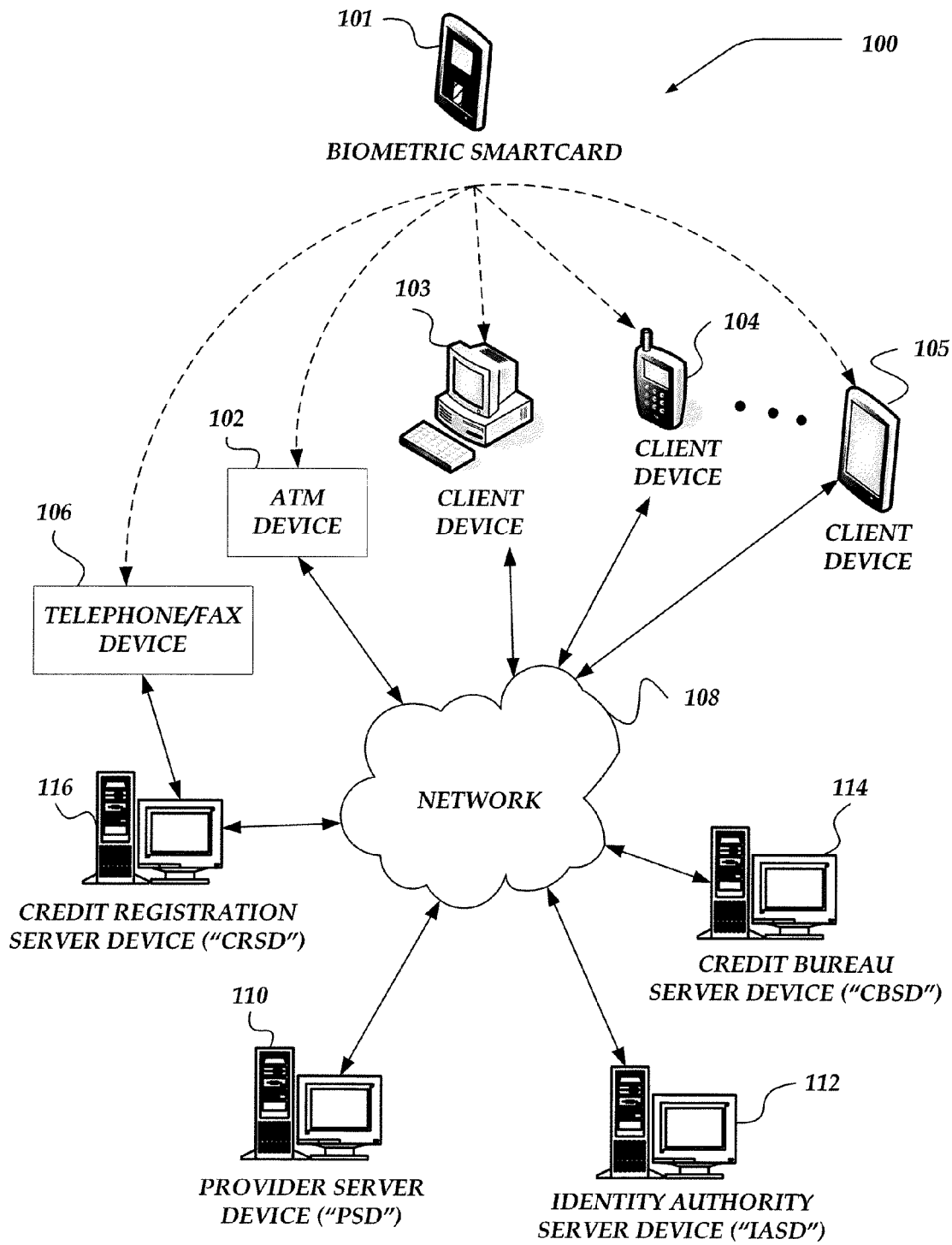
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "consumer" refers to any person who applies for credit.

As used herein, the term "provider" refers to any entity, individual, partnership, company, business, or the like that may provide credit and/or a credit-based services and/or products to a consumer. Providers may include, but are not limited to, banks, companies offering post-paid billing services, utility companies, retailers, merchants, vendors, wholesalers, dealers, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards a non-repudiation process for consumer credit requests based on an affirmative authentication of a one-time-pin ("OTP") generated from a consumer biometric smartcard. A consumer may be provided one or more biometric smartcards and one or more unique identification numbers ("UIDNs"). The biometric smartcard may include one or more biometric templates of biometric information of the consumer. Such biometric information may include, fingerprints, facial images, iris images, or the like, or any combination thereof. When the consumer requests credit, the consumer may utilize the biometric smartcard to generate an OTP. In some embodiments, the OTP may be generated when biometric information of the consumer is affirmatively authenticated by the biometric smartcard. Biometric information of the consumer may be captured by the biometric smartcard when the consumer presses a finger on a touch sensor, takes a facial image and/or an iris image using an image sensor, or the like, or any combination thereof.

In some embodiments, a consumer may provide a credit request to a provider. In one embodiment, the provider may request an OTP from the consumer and provide it to an identity authority. In other embodiments, the identity authority may request the OTP from the consumer. The identity authority may provide the provider a provider verification transaction number ("PVTN") when the OTP is authentic, indicating that the credit request is authentic.

In yet other embodiments, the consumer may provide an OTP to an identity authority for authentication prior to providing a credit request to a provider. When the OTP is authentic, the identity authority may provide the consumer a consumer verification transaction number ("CVTN"). The consumer may include the CVTN with a credit request to a provider. The provider may send the CVTN to the identity authority for authentication. The identity authority may provide the provider a PVTN when the CVTN is authentic, indicating that the credit request is authentic.

In at least one embodiment, the provider may request a credit report from a credit bureau for an authentic credit request. In other embodiments, requesting a credit report from a credit bureau may be optional and may not be performed. The provider may utilize a received credit report to determine whether or not the consumer has an acceptable credit rating. If the consumer has an acceptable credit rating, then the provider may provide credit to the consumer; otherwise, the provider may reject the credit request from the consumer. In some embodiments, a provider may internally maintain credit reports and/or credit ratings for consumers separate from credit bureaus.

In at least one of the various embodiments, a process is provided to authenticate a consumer for a financial service from a provider over a network. The provider receives a request for the financial service from the consumer that is assigned a biometric card and a unique identification number ("UIDN") that corresponds to the biometric card. The biometric card is employed to determine an authenticity of biometric information about the consumer that is captured by the biometric card. The provider provides at least the UIDN received from the consumer to an identity authority that determines an authenticity of a one time pin ("OTP"). The OTP is generated by the biometric card based on at least affirmative authentication of biometric information about the consumer. Next, the identity authority authorizes the provider to provide the consumer with access to the financial service based on the identity authority's affirmative authentication of the OTP provided by the consumer.

In at least one of the various embodiments, the consumer provides the OTP to the provider along with the UIDN and the request for financial services. Also, in at least one of the various embodiments, the provider requests and receives the OTP from the consumer after the provider receives the request for financial services. Additionally, in at least one of the embodiments, the third party entity requests and receives the OTP after the provider receives the request for financial services.

Moreover, in at least one of the embodiments, several actions occur, including: (1) employing the third party entity to receive the OTP from the consumer prior to the provider receiving the request; (2) employing the third party entity to provide a consumer verification transaction number ("CVTN") to the consumer based on an affirmative authentication of the OTP; (3) employing the provider to receive the CVTN from the consumer; (4) employing the provider to provide the CVTN to the third party entity; and (5) employing the third party entity to authorize the provider to provide the consumer with access to the financial service based on the third party entity's affirmative authentication of the CVTN provided by the consumer.

In at least one of the various embodiments, the biometric information about the consumer includes at least one of a fingerprint, a facial image, and an image of an iris in an eye of the consumer. Also, in at least one of the various embodiments, the provider requests a credit report about the consumer from a credit bureau based on at least one of the UIDN and a consumer verification transaction number ("CVTN"), and a provider verification transaction number ("PVTN"). In other embodiments, the provider may not request a credit report about the consumer from a credit bureau. Additionally, in at least one of the various embodiments, the OTP is communicated to the identity authority by at least one of a telephone call, a fax, a physical letter, an electronic message, and a website.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention.

As shown, system 100 of FIG. 1 includes automated teller machine ("ATM") device 102, client devices 103-105, telephone/fax device 106, network 108, provider server device ("PSD") 110, identity authority server device ("IASD") 112, credit bureau server device ("CBSD") 114, and credit registration server device ("CRSD") 116. System 100 also includes biometric smartcard 101. Network 108 is in communication with and enables communication between ATM device 102, client devices 103-105, PSD 110, IASD 112, CBSD 114, and CRSD 116. CRSD 116 is in communication with network 108 and telephone/fax device 106. In some embodiments, biometric smartcard 101 may be in communication with ATM device 102, client devices 103-105, and/or telephone/fax device 106.

One embodiment of biometric smartcard 101 is described in more detail below in conjunction with FIG. 4. Briefly, however, biometric smartcard 101 may include virtually any device capable of capturing biometric information of a consumer and authenticating it with stored biometric templates. Such biometric information may include, but is not limited to, fingerprints, handprints, palm prints, facial images, iris images, or the like. In some embodiments, biometric smartcard 101 may provide information, such as a one-time-pin ("OTP"), upon affirmative authentication of the consumer's biometric information. One example of biometric smartcard 101 that provides an OTP is disclosed in U.S. Patent Application Publication No. US 2005/0044387 A1, which is incorporated by reference herein.

Information from biometric smartcard 101 may be communicated to client devices 103-105, ATM device 102, and/or telephone/fax device 106 in a number of different methods. In some embodiments, a consumer may enter information from biometric smartcard 101 into ATM device 102, client devices 103-105, and/or telephone/fax device 106 by keypad, speech recognition, or the like. In other embodiments, biometric smartcard 101 may be connected to and/or part of client devices 103-105, ATM device 102, and/or telephone/fax device 106. For example, in one embodiment, client device 103 may include biometric smartcard 101. In another embodiment, biometric smartcard 101 may communicate with client device 103 through an input/output interface, such as, for example, but not limited to, through a universal serial bus ("USB") port.

Telephone/fax device 106 may include virtually any landline telephone device configured to send and receive sounds via a pair of wires connected to a telephone network (e.g. public switched telephone network ("PSTN")). Telephone/fax device 106 may include virtually any facsimile device configured to scan printed material (e.g. drawings, photographs, or the like) and transmit the scanned data by radio or telephone for reproduction elsewhere. In some embodiments, telephone/fax device 106 may include a landline telephone device, a facsimile device, and/or any combination thereof.

ATM device 102 may include virtually any device configured to dispense cash and/or products upon verification of a consumer's identity. In some embodiments, ATM device 102 may employ provide credit to a consumer upon verification of the consumer's identity, such as by utilizing at least one of the processes described below in conjunction with FIGS. 5, 6, 8, and/or 10. In one embodiment, at least some of the functions of PSD 110 may be performed by ATM device 102.

One embodiment of client devices 103-105 is described in more detail below in conjunction with FIG. 2. In one embodiment, at least some of client devices 103-105 may operate over a wired and/or a wireless network, such as networks 108. Generally, client devices 103-105 may include virtually any computing device capable of communicating over a network to send and receive information, including instant messages, performing various online activities, or the like. It should be recognized that more or less client devices may be included within a system such as described herein, and embodiments are therefore not constrained by the number or type of client devices employed.

Devices that may operate as client device 103 may include devices that typically connect using a wired or wireless communications medium, such as personal computers, servers, multiprocessor systems, microprocessor-based or programmable consumer electronics, network PCs, or the like. In some embodiments, client devices 103-105 may include virtually any portable computing device capable of connecting to another computing device and receiving information, such as smart phone 104, tablet computer 105, or the like. However, portable computer devices are not so limited an may also include other portable devices, such as laptop computers, cellular telephones, display pagers, radio frequency ("RF") devices, infrared ("IR") devices, Personal Digital Assistants ("PDAs"), handheld computers, wearable computers integrated devices combining one or more of the preceding devices, and the like. As such, client devices 103-105 typically range widely in terms of capabilities and features. Moreover, client devices 103-105 may provide access to various computing applications, including a browser, or other web-based applications.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 103-105 also may include at least one other client application that is configured to receive and/or send data between another computing device. The client application may include a capability to provide send and/or receive content, or the like. The client application may further provide information that identifies itself, including a type, capability, name, or the like. In one embodiment, client device 103-105 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, PSD 110, IASD 112, or other computing devices.

Client devices 103-105 may further be configured to include a client application that enables an end-user to log into an end-user account that may be managed by another computing device, such as PSD 110, IASD 112, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Network 108 is configured to couple network devices with other computing devices, including, ATM device 102, PSD 110, IASD 112, CBSD 114, CRSD 116, and client devices 103-105. Network 108 is enabled to employ any form of computer readable media for communicating information from one electronic device to another. Also, network 108 can include the Internet in addition to LANs, WANs, direct connections, such as through a USB port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices. In some other embodiments, network 108 may support voice over Internet Protocol ("VOIP") applications, plane old telephone service ("POTS"), or the like.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiments, network 108 may also be configured to include a wireless network. Such a wireless network may be configured to couple client devices 104-105 and its components with other networks and/or computing devices, such as PSD 110, IASD 112, or the like. The wireless network may include any of a variety of wireless sub-networks that may further overlay stand-alone ad-hoc networks, and the like, to provide an infrastructure-oriented connection for client devices 104-105. Such sub-networks may include mesh networks, Wireless LAN ("WLAN") networks, cellular networks, and the like. In one embodiment, the system may include more than one wireless network.

Such a wireless network may further include an autonomous system of terminals, gateways, routers, and the like connected by wireless radio links, and the like. These connectors may be configured to move freely and randomly and organize themselves arbitrarily, such that the topology of the wireless network may change rapidly.

Further, such a wireless network may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 104-105 with various degrees of mobility. In one non-limiting example, wireless network may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-105 and another computing device, network, and the like.

One embodiment of PSD 110 is described in more detail below in conjunction with FIG. 3. Briefly, however, PSD 110 may include virtually any network device that receives credit requests and provides credit to consumers, such as a user of ATM device 102, client devices 103-105, telephone/fax device 106, or the like. In some embodiments, PSD 110 may provide the requested credit, if the consumer's identity is authenticated, such as by IASD 112. In at least one of the various embodiments, PSD 110 may communicate with CBSD 114 to receive a credit report for a consumer whose identity has been authenticated. In one embodiment, PSD 110 may provide CBSD 114 with information for credit report updates, such as, but not limited to, approved credit requests, rejected credit requests, unauthentic credit requests, or the like.

In some embodiments, PSD 110 may request an OTP from a consumer for a credit request provided by the consumer. In some embodiments, PSD 110 may utilize an automated process and telephone number provided by the consumer to call the consumer for the OTP. In other embodiments, PSD 110 may utilize other communication means (e.g. an SMS message, email message, or the like) to request an OTP from the consumer. PSD 110 may provide a received OTP to an identity authority, such as IASD 112, for verification. In one embodiment, PSD 110 may receive a provider verification transaction number ("PVTN") from IASD 112 when the received OTP is authentic.

In other embodiments, PSD 110 may receive a consumer verification transaction number ("CVTN) with a credit request from a consumer. In one such embodiment, the consumer may receive the CVTN from an identity authority, such as IASD 112, which is described in more detail below. PSD 110 may provide the CVTN to IASD 112 for verification. In one embodiment, PSD 110 may receive a PVTN from IASD 112 when the received CVTN is authentic.

In some other embodiments, PSD 110 may receive a credit request from a consumer without an OTP and/or CVTN. In one such embodiment, PSD 110 may send an identification verification request for the credit request to IASD 112. In one embodiment, PSD 110 may receive a PVTN from IASD 112 when an OTP requested from the consumer by IASD 112 is authentic, which is described in more detail below.

In another embodiment, PSD 110 may communicate with CRSD 116 to receive consumer information provided by telephone/fax device 106, such as, but not limited to, credit requests, OTPs, CVTNs, or the like. In at least one of the various embodiments, PSD 110 may also communicate (not shown) with telephone/fax device 106 directly to request an OTP from a consumer.

Devices that may operate as PSD 110 include various network devices, including, but not limited to, personal computers, desktop computers, multiprocessor systems, microprocessor-based or programmable consumer electronics, network PCs, server devices, network appliances, and the like.

Although FIG. 1 illustrates PSD 110 as a single computing device, the invention is not so limited. For example, one or more functions of PSD 110 may be distributed across one or more distinct network devices. Moreover, PSD 110 is not limited to a particular configuration. Thus, in one embodiment, PSD 110 may contain a plurality of network devices that operate using a master/slave approach, where one of the plurality of network devices of PSD 110 operate to manage and/or otherwise coordinate operations of the other network devices. In other embodiments, the PSD 110 may operate as a plurality of network devices within a cluster architecture, a peer-to-peer architecture, and/or even within a cloud architecture. Thus, the invention is not to be construed as being limited to a single environment, and other configurations, and architectures are also envisaged. Furthermore, in some embodiments, each of a plurality of providers may have a separate and/or combined PSD 110.

One embodiment of IASD 112 is described in more detail below in conjunction with FIG. 3. Briefly, however, IASD 112 may include virtually any network device that verifies and/or authenticates a consumer's identity, such as an identity of a user of ATM device 102, client devices 103-105, telephone/fax device 106, or the like. In at least one of the various embodiments, IASD 112 may also communicate (not shown) with telephone/fax device 106 to receive and/or request an OTP from a consumer.

In some embodiments, IASD 112 may receive an identity verification request of a consumer credit request for a provider, such as PSD 110. In one embodiment, the identity verification request may include an OTP and UIDN provided by the consumer. IASD 112 may authenticate the received OTP based on the UIDN and the OTP. In at least some embodiments, IASD 112 may provide PSD 110 with a verification response after the OTP is authenticated. In one embodiment, the verification response may include a PVTN when the received OTP is authentic. In another embodiment, the verification response may indicate that the OTP authentication failed.

In other embodiments, IASD 112 may receive consumer verification information from a consumer. In one embodiment, the consumer verification information may include an OTP, UIDN, registration identifier ("RID") for a provider, and/or a product/service number ("PSN"), or the like. In at least one of the various embodiments, IASD 112 may authenticate the received OTP based on the UIDN and the OTP. IASD 112 may provide a CVTN to the consumer when the received OTP is authentic. In some embodiments, IASD 112 may receive an identify verification request from a provider, such as PSD 110. In one embodiment, the identify verification request may include a UIDN, CVTN, RID, and/or PSN. IASD 112 may authenticate the received CVTN based on the UIDN and the CVTN. In at least some embodiments, IASD 112 may provide PSD 110 with a verification response after the CVTN is authenticated. In one embodiment, the verification response may include a PVTN when the CVTN is authentic. In another embodiment, the verification response may indicate that the CVTN authentication failed.

In yet other embodiments, IASD 112 may receive an identify verification information from a provider, such as PSD 110, for a consumer without an OTP and/or CVTN. In one such embodiment, IASD 112 may request an OTP from the consumer. In some embodiments, IASD 112 may utilize an automated process and telephone number provided by the consumer to call the consumer for the OTP. In other embodiments, IASD 112 may utilize other communication means (e.g. an SMS message, email message, or the like) to request an OTP from the consumer. IASD 112 may authenticate a received OTP based on a UIDN for the consumer and the OTP. In at least some embodiments, IASD 112 may provide PSD 110 with a verification response after the OTP is authenticated. In one embodiment, the verification response may include a PVTN when the received OTP is authentic. In another embodiment, the verification response may indicate that the OTP authentication failed.

Devices that may operate as IASD 112 include various network devices, including, but not limited to, personal computers, desktop computers, multiprocessor systems, microprocessor-based or programmable consumer electronics, network PCs, server devices, network appliances, and the like.

Although FIG. 1 illustrates IASD 112 as a single computing device, the invention is not so limited. For example, one or more functions of IASD 112 may be distributed across one or more distinct network devices. Moreover, IASD 112 is not limited to a particular configuration. Thus, in one embodiment, IASD 112 may contain a plurality of network devices that operate using a master/slave approach, where one of the plurality of network devices of IASD 112 operate to manage and/or otherwise coordinate operations of the other network devices. In other embodiments, the IASD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of CBSD 114 is described in more detail below in conjunction with FIG. 3. Briefly, however, CBSD 114 may include virtually any network device that manages credit reporting for consumers and/or providers. In some embodiments, CBSD 114 may receive credit report requests from a provider, such as PSD 110. In one embodiment, CBSD 114 may utilize a received PVTN and/or UIDN to select and provide a credit report for the consumer to PSD 110. In other embodiments, CBSD 114 may update credit reports based on credit approvals of a provider. In one embodiment, CBSD 114 may update credit reports based on failed consumer authentication (i.e. failed OTP and/or CVTN authentication).

In some embodiments, at least some of the functions of CBSD 114 may be performed by PSD 110 and/or IASD 112. For example, PSD 110 may maintain an internal credit reporting system separate from CBSD 114. In one embodiment, PSD 110 may maintain credit reports for credit requests under a predetermined threshold (e.g. $100.00). In some embodiments, an internal credit reporting system may be beneficial because it may be uneconomical to utilize an external credit bureau (e.g. CBSD 114) for some purchases (e.g. purchases under a defined amount).

Devices that may operate as CBSD 114 include various network devices, including, but not limited to, personal computers, desktop computers, multiprocessor systems, microprocessor-based or programmable consumer electronics, network PCs, server devices, network appliances, and the like.

Although FIG. 1 illustrates CBSD 114 as a single computing device, the invention is not so limited. For example, one or more functions of CBSD 114 may be distributed across one or more distinct network devices. Moreover, CBSD 114 is not limited to a particular configuration. Thus, in one embodiment, CBSD 114 may contain a plurality of network devices that operate using a master/slave approach, where one of the plurality of network devices of CBSD 114 operate to manage and/or otherwise coordinate operations of the other network devices. In other embodiments, the CBSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged. Furthermore, in some embodiments, each of a plurality of credit bureaus may have a separate and/or combined CBSD 114.

One embodiment of CRSD 116 is described in more detail below in conjunction with FIG. 3. Briefly, however, CRSD 116 may include virtually any network device that communicates with telephone/fax device 106 to provide information to PSD 110 and/or IASD 112. In some embodiments, CRSD 116 may utilize an automated telephone service to receive a credit request from a consumer. In other embodiments, CRSD 116 may utilize an automated telephone service to request and/or receive an OTP, UIDN, or the like from a consumer using telephone/fax device 106. In some other embodiments, at least some of the functions of CRSD 116 may be performed by PSD 110 and/or IASD 112.

Devices that may operate as CRSD 116 include various network devices, including, but not limited to, personal computers, desktop computers, multiprocessor systems, microprocessor-based or programmable consumer electronics, network PCs, server devices, network appliances, and the like.

Although FIG. 1 illustrates CRSD 116 as a single computing device, the invention is not so limited. For example, one or more functions of CRSD 116 may be distributed across one or more distinct network devices. Moreover, CRSD 116 is not limited to a particular configuration. Thus, in one embodiment, CRSD 116 may contain a plurality of network devices that operate using a master/slave approach, where one of the plurality of network devices of CRSD 116 operate to manage and/or otherwise coordinate operations of the other network devices. In other embodiments, CRSD 116 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
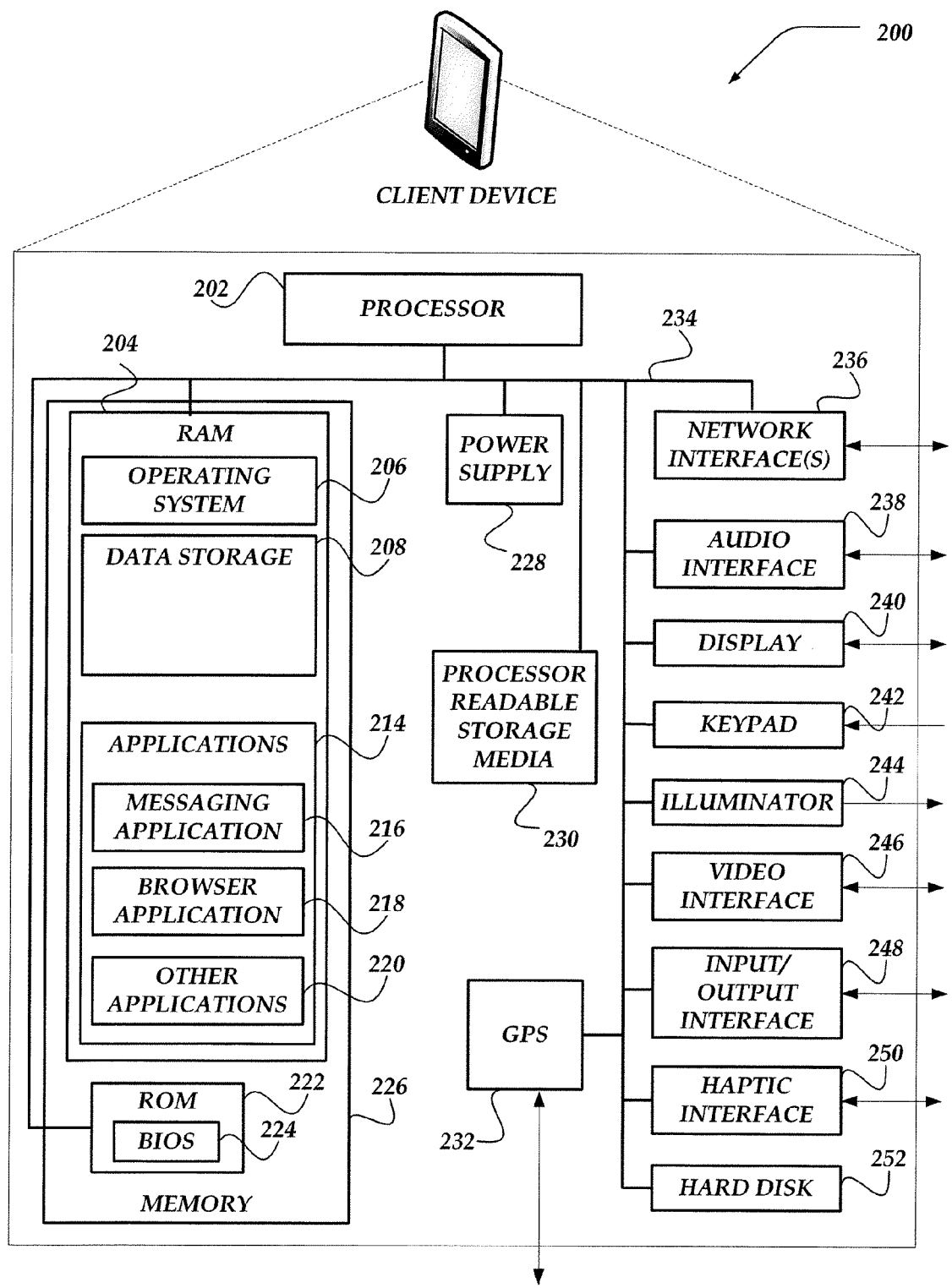
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 103-105 of FIG. 1.

As shown in the figure, client device 200 includes a processor 202 in communication with memory 226 via a bus 234. In some embodiments, processor 202 may include one or more central processing units. Client device 200 also includes a power supply 228, one or more network interfaces 236, an audio interface 238, a display 240, a keypad 242, an illuminator 244, a video interface 246, an input/output interface 248, a haptic interface 250, a hard disk 252, a global positioning system ("GPS") transceiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), SMS, general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Memory 226 illustrates an example of computer readable storage media (devices) for storage of information such as computer readable instructions, data structures, program modules or other data. Memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. In some embodiments, data storage 208 may store credit request information, credit report information, or the like. At least a portion of the information may also be stored on another component of client device 200, including, but not limited to processor readable storage media 230, hard disk 252, or other computer readable storage medias (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage media 230 may also be referred to as computer readable storage device.

Applications 214 may include computer executable instructions which, when executed by client device 200, transmit, receive, and/or otherwise process network data. Network data may include, but is not limited to, messages (e.g. SMS, Multimedia Message Service ("MMS"), instant message ("IM"), email, and/or other messages), audio, video, and enable telecommunication with another user of another client device. Applications 214 may include, for example, messaging application 216, browser application 218, or the like. Applications 214 may include other applications 220, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Messaging application 216 may be configured to manage a messaging session using any of a variety of messaging communications including, but not limited to email, SMS, IM, MMS, internet relay chat ("IRC"), Microsoft IRC ("mIRC"), Really Simple Syndication ("RSS") feeds, and/or the like. For example, in one embodiment, messenger 216 may be configured as an IM application, such as AOL (America Online) Instant Messenger, Yahoo! Messenger, .NET Messenger Server, ICQ ("I seek you"), or the like. In one embodiment, messaging application 216 may be configured to include a mail user agent ("MUA") such as Elm, Pine, Message Handling ("MH"), Outlook, Eudora, Mac Mail, Mozilla Thunderbird, or the like. In another embodiment, messaging application 216 may be a client application that is configured to integrate and employ a variety of messaging protocols, including, but not limited to various push and/or pull mechanisms for client device 200. In one embodiment, messaging application 216 may interact with browser application 218 for managing messages. As used herein, the term "message" refers to any of a variety of messaging formats, or communications forms, including, but not limited to, email, SMS, IM, MMS, IRC, or the like. In one embodiment, messaging application 216 may enable a user of client device 200 (i.e. a consumer) to communicate with another network device, such as PSD 110, IASD 112, or the like. For example, messaging application 216 may enable a consumer to provide information (e.g. OTP, UIDN, CVTNs, or the like) to a provider and/or an identity authority. In other embodiments, messaging application 216 may enable a consumer to receive OTP requests, CVTNs, or the like.

Browser application 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser application 218 may enable a user of client device 200 to communicate with another network device, such as PSD 110, IASD 112, or the like. For example, browser application 218 may enable a consumer to provide information (e.g. OTP, UIDN, CVTNs, or the like) to a provider and/or an identity authority.

Illustrative Network Device

Figure 3:
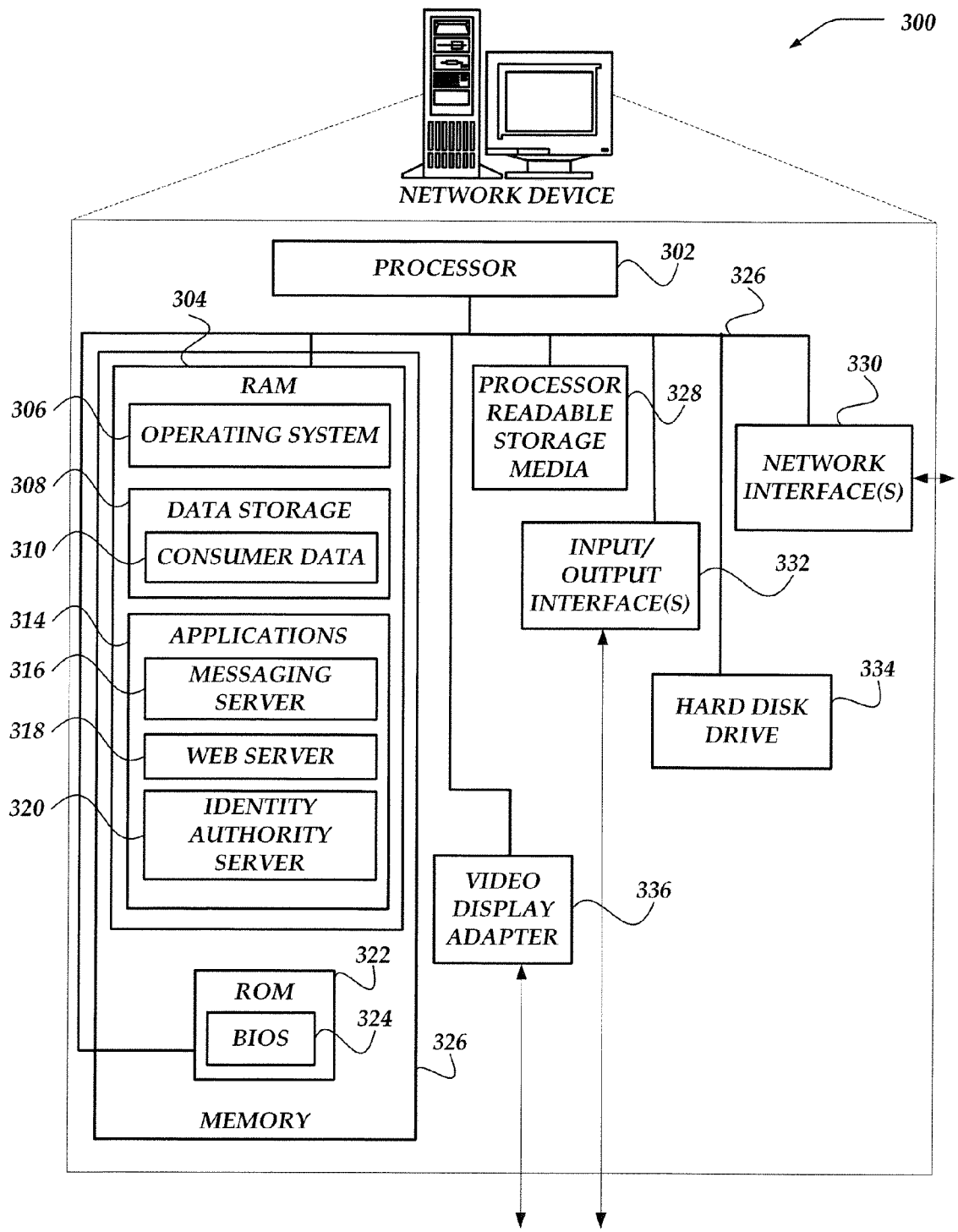
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example PSD 110, IASD 112, CBSD 114, and/or CRSD 116 of FIG. 1, and/or other network devices.

Network device 300 includes processor 302, processor readable storage media 328, network interface unit 330, an input/output interface 332, hard disk drive 334, video display adapter 336, and memory 326, all in communication with each other via bus 326. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like. In some embodiments, Network device 300 may communicate with biometric smartcard 400 through input/output interface 332.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system ("BIOS") 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 200.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as processor 302 to execute and perform actions. In one embodiment, at least some of data store 308 might also be stored on another component of network device 300, including, but not limited to processor-readable storage device 328, hard disk drive 334, or the like.

Data storage 308 may further store consumer data 310. Consumer data 310 may include credit requests, credit records (e.g. approved credit requests, rejected credit requests, credit payments, fees, or the like), consumer UIDNs, PVTNs for authentic credit requests, credit reports, CVTNs, RIDs, PSNs, or the like. Consumer data 310 may also include personal information for consumers, biometric smartcard information, or the like.

Applications 314 may include computer executable instructions, which may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Messaging server 316, web server 318, and identity authority server ("IAS") 320 may also be included as application programs within applications 314.

Messaging server 316 may include virtually any computing component or components configured and arranged to forward messages from message user agents, and/or other message servers, or to deliver messages to a local message store, such as data storage 308, or the like. Thus, messaging server 316 may include a message transfer manager to communicate a message employing any of a variety of email protocols, including, but not limited to Simple Mail Transfer Protocol ("SMTP"), Post Office Protocol ("POP"), Internet Message Access Protocol ("IMAP"), Network New Transfer Protocol ("NNTP"), or the like. Messaging server 316 may also be managed by one or more components of messaging server 316. Thus, messaging server 316 may also be configured to manage SMS messages, IM, MMS, IRC, RSS feeds, mIRC, or any of a variety of other message types. In one embodiment, messaging server 316 may enable users to initiate and/or otherwise conduct chat sessions, VOIP sessions, or the like. In some embodiments, messaging server 316 may be configured to enable a consumer (e.g. a user of client devices 103-105 of FIG. 1) to provide credit requests, identity verification information (e.g. OTP, UIDN, CVTN, RID, PSN, or the like) to a provider (e.g. PSD 110 of FIG. 1), identity authority (e.g. IASD 112 of FIG. 1), or the like.

Web server 316 represent any of a variety of services that are configured to provide content, including messages, over a network to another computing device. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a consumer (e.g. a user of client devices 103-105 of FIG. 1) to provide credit requests, identity verification information (e.g. OTP, UIDN, CVTN, RID, PSN, or the like) to a provider (e.g. PSD 110 of FIG. 1), identity authority (e.g. IASD 112 of FIG. 1), or the like.

IAS 320 may be configured to perform credit request authentication services for a provider. In some embodiments, IAS 320 may receive identity verification requests from a provider and may respond with a verification response. In one embodiment, IAS 320 may authenticate an OTP generated by a biometric smartcard of a consumer. In at least one embodiment, IAS 320 can request an OTP from a consumer. In some embodiments, IAS 320 may generate and provide a consumer a CVTN when an OTP is authentic. In other embodiments, IAS 320 may generate and provide a provider a PVTN when an OTP is authentic or when a CVTN received from the provider is authentic. In any event, IAS 320 may employ processes, or parts of processes, similar to those described elsewhere in the Specification such as in conjunction with FIGS. 5, 6, 8, and 10 to perform at least some of its actions.

Illustrative Biometric Smartcard

Figure 4:
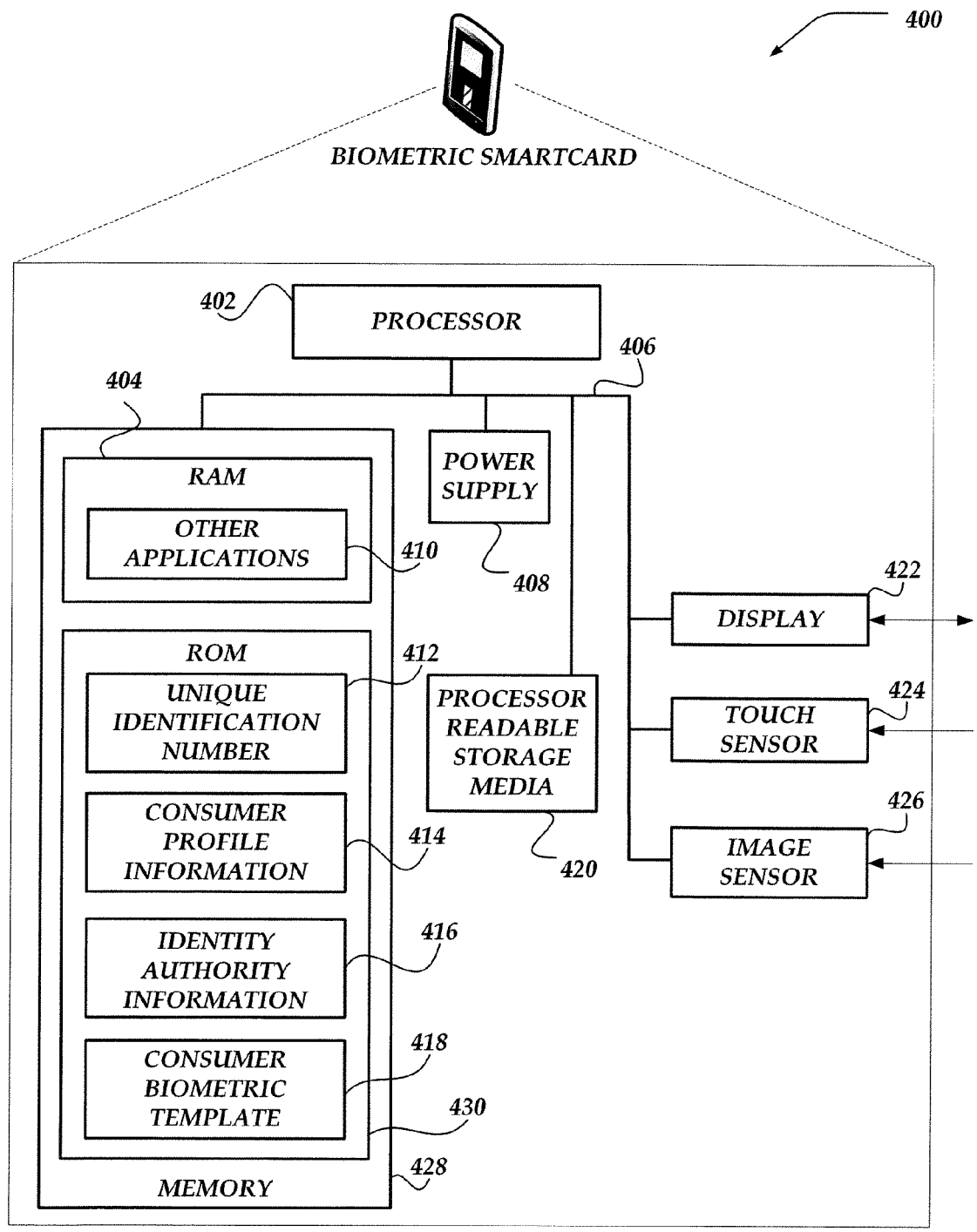
FIG. 4 shows an embodiment of a biometric smartcard that may be utilized in a system such as that shown in FIG. 1.

FIG. 4 shows one embodiment of a biometric smartcard 400, according to one embodiment of the invention. Biometric smartcard 400 may include many more or less components than those shown. The components shown, however, are sufficient to disclose an illustrative embodiment for practicing the invention. Biometric smartcard 400 may represent, for example, one embodiment of biometric smartcard 101 of FIG. 1.

As shown in the figure, biometric smartcard 400 includes a processor 402 in communication with memory 428 via a bus 406. In some embodiments, processor 202 may include one or more central processing units. Biometric smartcard 400 also includes a power supply 408, a display 422, a touch sensor 424, and an image sensor 426.

Power supply 408 provides power to biometric smartcard 400. A rechargeable or non-rechargeable battery may be used to provide power. The power may also be provided by an external power source, such as an alternating current ("AC") adapter or a powered docking cradle that supplements and/or recharges a battery.

Display 422 may be a liquid crystal display ("LCD"), gas plasma, light emitting diode ("LED"), digital ink display panel, or any other type of display used with a computing device. Display 422 may also include a touch sensitive screen arranged to receive input from an object such as a stylus or a digit from a human hand. Such a touch sensitive screen may, in one embodiment, employ embodiments of touch sensor 424.

Touch sensor 424 may be configured to capture biometric information of a consumer when the consumer swipes, presses, or otherwise touches a body part to touch sensor 424. Touch sensor 424 may be configured to capture a consumer's fingerprint, palm print, handprint, or the like. In one embodiment, fingerprints from one or more fingers may be captured by touch sensor 424. In other embodiments, touch sensor 424 may be configured to detect body temperature, a human pulse, or the like.

Image sensor 426 may be configured to capture biometric information of a consumer using an image detection device. In one embodiment, image sensor 426 may include a complementary metal-oxide-semiconductor ("CMOS") integrated circuit, charge-coupled device ("CCD"), or any other integrated circuit for sensing light. Image sensor 426 may be configured to capture an image of a consumer's face, iris, or the like. In some embodiments, image sensor 426 may capture still photos, video segments, or the like.

Memory 428 includes a Random Access Memory ("RAM") 404, a Read-only Memory ("ROM") 430, and other storage means. Memory 428 illustrates an example of computer readable storage media (devices) for storage of information such as computer readable instructions, data structures, program modules or other data.

ROM 430 may store unique identification number ("UIDN") 412, consumer profile information 414, identity authority information 416, and consumer biometric template 418. UIDN 412 may include a unique number assigned to a consumer of biometric smartcard 400. In one embodiment, UIDN may be assigned to the consumer by an identity authority. In some embodiments, UIDN 412 may uniquely correspond to consumer biometric template 418.

Consumer biometric template 418 may include one or more biometric templates of biometric information of a consumer of biometric smartcard 400. Consumer biometric template 418 may include one or more templates of the consumer's fingerprints, palm prints, handprints, facial image, iris image or the like, or any combination thereof. Consumer biometric template 418 may be utilized (e.g. by other applications 410) to authenticate a fingerprint, facial image, iris image, or the like captured by touch sensor 424 and/or image sensor 426. Consumer biometric template 418 may be encrypted and/or otherwise stored on biometric smartcard 400 to obstruct external access to consumer biometric template 418 (i.e. make it difficult for a person and/or external device/application to hack and/or otherwise steal consumer biometric template 418).

Consumer profile information 414 may include additional information about a consumer of biometric smartcard 400. Consumer profile information 414 may include, but is not limited to, the consumer's name, residence, citizenship, telephone number, fax number, other personal information, or the like, or any combination thereof.

Identity authority information 416 may include information about an identity authority associated with the biometric smartcard. Identity authority information 416 may include, but is not limited to, a telephone number, fax number, text-based mobile phone number (e.g. SMS-supported mobile phone number), a website uniform resource locator ("URL"), an email address, or the like.

Memory 418 may also store other applications 410. In some embodiments, other applications 410 may include an application for authenticating biometric information captured by touch sensor 424 and/or image sensor 426. In one embodiment, such authenticating application may compare captured biometric information with consumer biometric template 418. When captured biometric information matches consumer biometric template 418, an authenticating application may indicate that the captured biometric information is authentic.

Other applications 410 may also include an application for generating an OTP when the captured biometric information is authentic. In some embodiments, a generated OTP may be displayed to the consumer on display 422. In at least one of the various embodiments, the OTP may have an expiration time period, such that the OTP may become unauthentic and/or invalid if an identity authority does not affirmatively authenticate the OTP before the expiration time period ends. Such an expiration time period may be based at least in part on security requirements, such as, but not limited to, an amount of time needed for the OTP to be provided to and authenticated by an identity authority.

Processor readable storage media 420 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage media 420 may also be referred to as computer readable storage device.

Biometric smartcard 400 may also comprises (not shown) an input/output interface for communicating with external devices, such as, for example, client devices 103-105 of FIG. 1. The input/output interface may utilize one or more communication technologies, such as USB, infrared, Bluetooth™, or the like. In other embodiments, biometric smartcard 400 may include (not shown) one or more networking interfaces. Such a networking interface may enable biometric smartcard to communicate with an identity authority, such as IASD 112. Such communication may enable the identity authority to authentic an OTP generated by biometric smartcard 400.

General Operation

Figure 5:
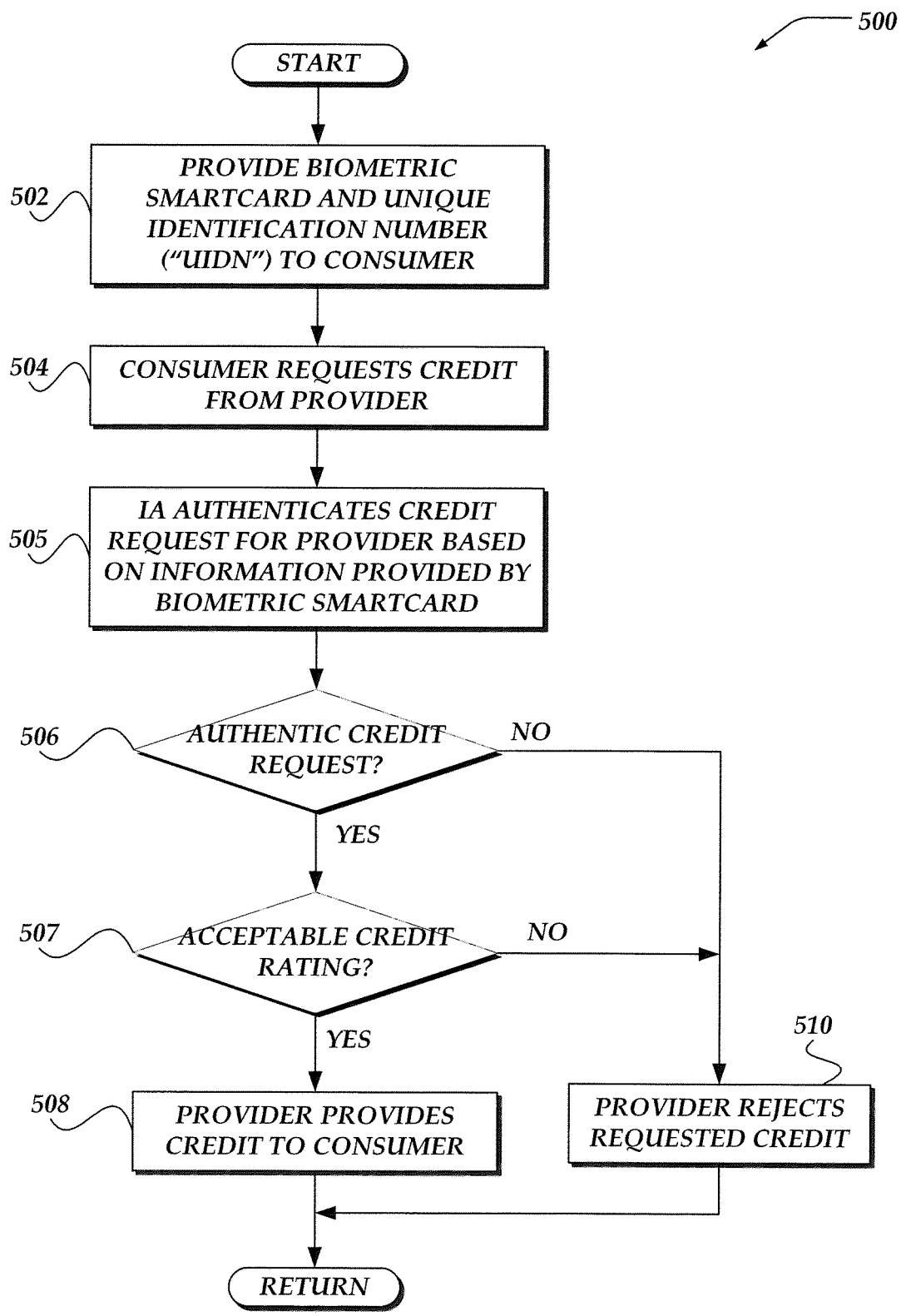
FIG. 5 illustrates a logical flow diagram generally showing one embodiment of an overview process for authenticating a credit request for a consumer.

The operation of certain aspects of the invention will now be described with respect to FIGS. 5-11. FIG. 5 illustrates a logical flow diagram generally showing one embodiment of an overview process for authenticating a credit request for consumer. In some embodiments, process 500 or portions of process 500 of FIG. 5 may be implemented by and/or executed on one or more network devices, such as network device 300 of FIG. 3.

Process 500 begins, after a start block, at block 502, where a biometric smartcard and UIDN may be provided to a consumer. In one embodiment, the biometric smartcard may be an embodiment of biometric smartcard 400 of FIG. 4. In at least one of the various embodiments, the UIDN may be unique to the consumer. In some embodiments, the UIDN may be unique to the biometric smartcard. The UIDN may be, but is not limited to, a social security number, a driver's license number, an employee identification number, account number, a consumer unique arbitrary number, or the like. In one embodiment, a consumer may receive one or more UIDNs. In some embodiments, each of a plurality of UIDNs may correspond to a different biometric smartcard.

The biometric smartcard and UIDN may be provided to the consumer by an identity authority. In some embodiments, a consumer may receive one or more biometric smartcards and/or UIDNs from one or more identity authorities. In one embodiment, the consumer may apply for the biometric smartcard with an identity authority. To apply for the biometric smartcard and/or UIDN, the consumer may, in one embodiment, provide personal information, including biometric information to the identity authority. Such biometric information may include, but is not limited to, biometric templates of fingerprints, handprints, palm prints, facial images, iris images, or the like, or any combination thereof. The biometric information may be utilized to create one or more biometric templates. The one or more biometric templates may be utilized to configure a biometric smartcard for the consumer. In one embodiment, the biometric templates may be stored in the circuitry of the biometric smartcard (e.g. in ROM). In some embodiments, the biometric templates may be encrypted, tamperproof, and/or otherwise secured within the biometric smartcard.

In some embodiments, the biometric smartcard may also be configured with personal information of the consumer. Such personal information may include, but is not limited to, the consumer's name, residence, citizenship, telephone number, fax number, place of work, and/or the like. In other embodiments, the biometric smartcard may be further configured to store information about the identity authority, such as, for example, a telephone number, fax number, a text-based mobile phone number (e.g. SMS-supported mobile phone number), a website URL, an email address, or the like.

Once configured, with at least one or more biometric templates, the biometric smartcard may be provided to the consumer. In one embodiment, the consumer may pick up the biometric smartcard in person at the identity authority. In another embodiment, the identity authority may send the biometric smartcard to the consumer, such as by mail, courier, or the like.

In at least one of the various embodiments, each biometric smartcard may include a unique serial number. The identity authority may store a mapping between each biometric smartcard serial number and a corresponding consumer's UIDN. In some embodiments, the identity authority may store consumer personal information, consumer UIDNs, biometric smartcard serial numbers, OTP generation algorithms for each biometric smartcard, or the like. In one embodiment, the identity authority may also store biometric information of the consumer.

In any event, process 500 continues at block 504, where the consumer requests credit from a provider. In at least one of the various embodiments, the provider may be separate and/or distinct from the identity authority. In some embodiments, credit may be requested online (e.g. through a provider's website), by telephone, by facsimile, by text-based messages (e.g. SMS), by email, in person, by paper mail, at an ATM device, or the like. In some embodiments, the consumer may fill out a credit application to request credit.

In some embodiments, the credit request may include the consumer's UIDN, a CVTN provided by an identity authority, other consumer information, credit request amount, payment plan, provider information, product and/or service information, or the like. Consumer information may include, for example, but is not limited to, telephone number, fax number, text-based mobile phone number, email address, home address, name, or the like. Payment plan information may include, for example, but is not limited to, frequency of payments, amount of payments, time period for repayment, late fees, or the like. Provider information may include, for example, but is not limited to, an RID, name, address, telephone number, fax number, website URL, email address, or the like. Product and/or service information may include, for example, but is not limited to, one or more PSNs, a product/service name/description, or the like, or the like.

Processing then flows to block 505, where an identity authority authenticates the consumer's credit request for the provider based on information provided by the consumer's biometric smartcard. In some embodiments, the identity authority may be a third party separate from the consumer and the provider. Various embodiments for authenticating the credit request are described in more detail below in conjunction with FIGS. 6, 8, and 10. In some embodiments, authenticating the credit requests includes authenticating an identity of the consumer.

In at least one of the various embodiments, the biometric smartcard may provide information to the consumer when biometric information of the consumer is affirmatively authenticated by the biometric smartcard. In one embodiment, biometric information may be authentic when a fingerprint of the consumer (e.g. when the consumer presses a finger on a touch sensor on the biometric smartcard) matches a fingerprint template stored on the biometric smartcard. In other embodiments, biometric information may be authentic when a facial image and/or iris image of the consumer matches a facial template and/or iris template, respectively, stored on the biometric smartcard. However, the invention is not so limited, and other biometric information may be authenticated, such as, for example, but not limited to, a palm print, handprint, or the like. In some embodiments, the biometric smartcard may provide information when a plurality of biometric information is affirmatively authenticated.

In some embodiments, the information provided by the biometric smartcard may include, for example, but not limited to, identity authority information, UIDN of the consumer, biometric smartcard serial number, or the like.

In other embodiments, the information provided by the biometric smartcard may be an OTP generated by the biometric smartcard. In some embodiments, the OTP may include an expiration time period for the OTP to be authenticated by the identity authority. Non-limiting, non-exhaustive examples of OTP expiration time periods may include, but are not limited to, 30 seconds, one minute, or the like. Thus, an OTP authentication may fail if the OTP is not affirmatively authenticated by the identity authority before the OTP expiration time period ends.

In some embodiments, the biometric smartcard and the identity authority may include a same OTP generation algorithm, such that both generate a same OTP within a same expiration time period. In such an embodiment, the identity authority may affirmatively authenticate an OTP generated from a biometric smartcard by matching it to an OTP generated by the identity authority utilizing the same OTP generation algorithm. For example, assume an OTP has a 3 minute expiration time period and both the biometric smartcard and the identity authority may generate a same OTP during the expiration time period. In such an example, if the identity authority receives an OTP after the expiration time period for the OTP, then the OTP generated by the identity authority may be different than the received OTP, which may result in a failed OTP authentication. In some embodiments, a received OTP that is different than an OTP generated by the identity authority may indicate that the received OTP is invalid either because the expiration time period may have ended and/or the received OTP may be unauthentic.

However, the invention is not so limited and other method may be employed for authenticating an OTP. For example, in one embodiment, when the biometric smartcard generates an OTP, the biometric smartcard may transmit a separate unique code to the identity authority. The identity authority can then utilize the separate code to generate an identity authority OTP (or other verification number) to compare with the biometric smartcard OTP. In some other embodiments, the biometric smartcard may notify the identity authority when an OTP is generated, which may start an expiration time period for that particular OTP.

In any event, process 500 continues at decision block 506, where a determination may be made whether the credit request was authentic. In some embodiments, the credit request may be authentic if an OTP received at the identity authority is authentic. In one embodiment, the received OTP may be authentic if it matches an OTP generated by the identity authority.

In other embodiments, the credit request may be authentic if a CVTN received at the identity authority is authentic. In one embodiment, a consumer may be provided a CVTN when an OTP is authentic. The CVTN may be included with the credit request and authenticated at the identity authority based on a comparison with the CVTN provided to the consumer. If the credit request is authentic, then processing flows to decision block 507; otherwise, processing flows to block 510.

At decision block 507, a determination may be made whether the consumer has an acceptable credit rating. In one embodiment, the provider may utilize a credit report for the consumer to determine if the consumer has an acceptable credit rating. In one embodiment, the provider may request a credit report from one or more credit bureaus, such as CBSD 114 of FIG. 1. In another embodiment, the provider may internally maintain credit reports and/or credit ratings for consumers. In at least one of the various embodiments, the credit bureau may be separate and/or distinct from the identity authority and/or the providers. In some other embodiments, requesting a credit report and/or credit rating from a credit bureau may be optional and may not be performed.

In some embodiments, a consumer may have an acceptable credit rating if the consumer's credit rating is above a defined threshold. In one embodiment, each good, service, credit amount, provider, or the like, may have a different threshold value for determining if the consumer's credit rating is acceptable. For example, assume consumer credit ratings may be from 0-800 points. Buying a $5.00 item on credit, in this example, may have an acceptable credit rating threshold of 400 points, where buying a $500.00 item on credit may have an acceptable credit rating threshold of 525 points, and so on. However, this example is not to be considered exhaustive or limiting; rather, other credit ratings, ranges of credit ratings, credit rating threshold values, or the like, may be employed.

If the consumer has an acceptable credit rating, then processing flows to block 508; otherwise, processing flows to block 510. At block 508, the provider may provide the requested credit to the consumer. In some embodiments, the provider may notify one or more credit bureaus that the provider approved the consumer's credit request. In some other embodiments, notifying the credit bureaus of approved consumer credit requests may be optional and may not be performed. Processing then returns to a calling process to perform other actions.

If the consumer does not have an acceptable credit rating or if the credit request is not authentic, then processing flows to block 510. At block 510, the credit request may be rejected by the provider. In one embodiment, the provider may notify the consumer that the credit request was rejected. The provider may notify the consumer of the rejected credit by telephone, facsimile, text-based message (e.g. SMS, email, or the like), paper mail, or the like. In one embodiment, the credit request rejection may indicate why the credit request was rejected (e.g. unauthentic credit request, unacceptable credit rating, or the like).

Figure 6:
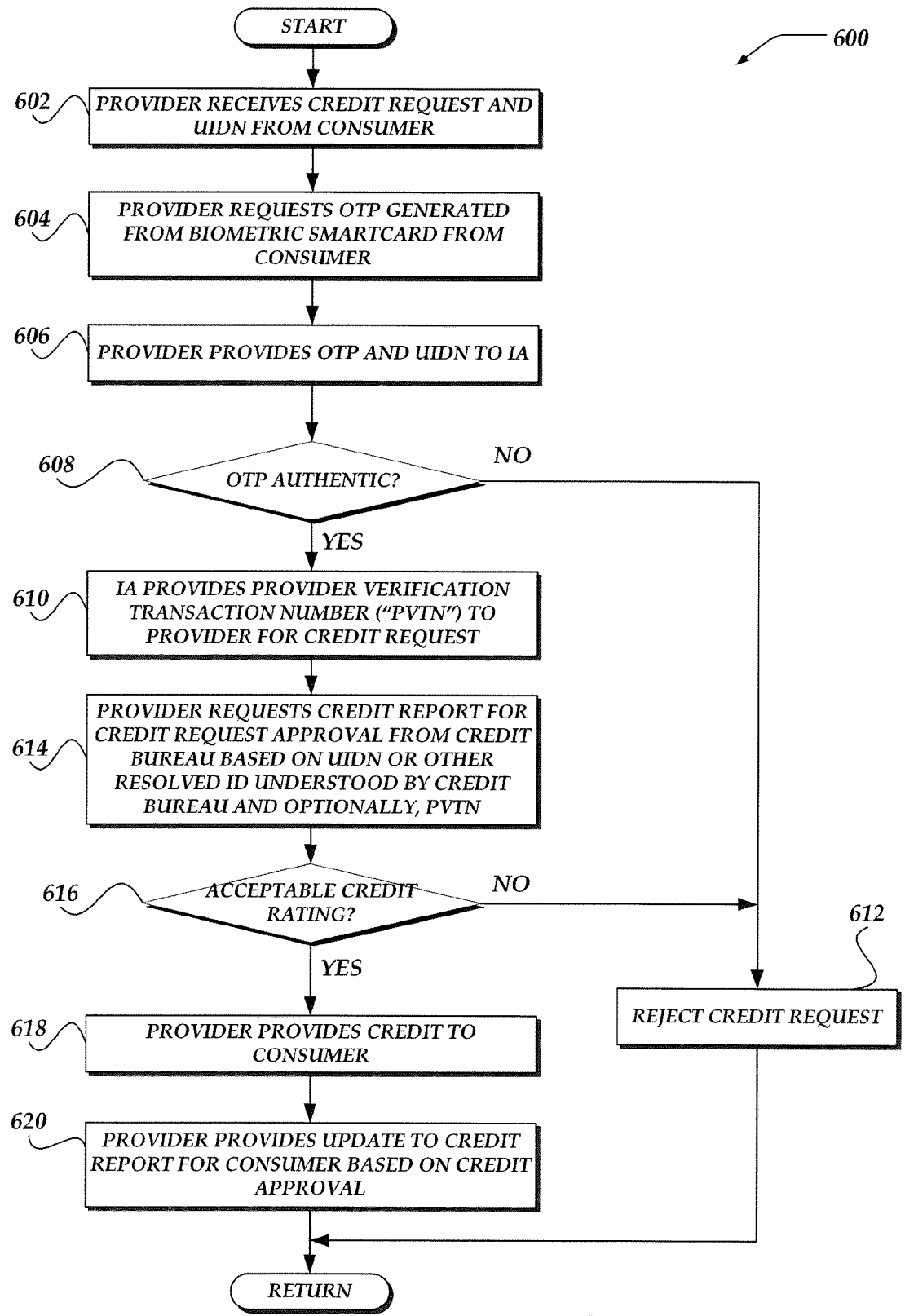
FIG. 6 illustrates a logical flow diagram generally showing one embodiment of a process for utilizing an identity authority and a one-time-pin generated from a consumer biometric smartcard to authenticate a credit request from a consumer.

FIG. 6 illustrates a logical flow diagram generally showing one embodiment of a process for utilizing an identity authority and a one-time-pin generated from a consumer biometric smartcard to authenticate a credit request from a consumer. In some embodiments, process 600 or portions of process 600 of FIG. 6 may be implemented by and/or executed on one or more network devices, such as network device 300 of FIG. 3

Process 600 begins, after a start block, at block 602, where a provider receives a credit request and UIDN from a consumer. In one embodiment, the consumer may provide the credit request and UIDN by way of a credit application. In some embodiments, the consumer may submit the credit application to the provider through a website, at an ATM device, by paper, in person, or the like. In at least one embodiment, block 602 may employ embodiments of block 504 of FIG. 5 for a consumer to provide a credit request to a provider.

Process 600 continues at block 604, where the provider requests an OTP generated from a biometric smartcard from the consumer. In one embodiment, the biometric smartcard may generate the OTP when biometric information entered into the biometric smartcard is affirmatively authenticated. In one embodiment, a plurality of biometric information may be entered for authentication, such as, for example, but not limited to, iris, facial, fingerprint, other biometric information, and/or any combination thereof. In one non-limiting example, an affirmative authentication may occur when a consumer presses a finger on a touch sensor, such that a fingerprint captured by the touch sensor matches a fingerprint template stored on the biometric smartcard.

The provider may request the OTP (and in some embodiments, the consumer's UIDN) from the consumer by way of telephone, text-based message (e.g. SMS, email, or the like), through an ATM device, in person, by paper mail, or the like. Once generated, the consumer may provide the OTP to the provider. In some embodiments, the consumer may provide the OTP to the provider by telephone, by facsimile, by text-based message (e.g. SMS, email, or the like), in person, through the provider's website, through an ATM device, by paper mail, or the like. In at least one of the various embodiments, the OTP may be provided to the provider through a secure means, such as, but not limited to, through a secured internet connection, or the like.

Process 600 next proceeds to block 606, where the provider may provide the OTP and UIDN to an identity authority. In some embodiments, the identity authority may be a third party separate from the consumer and the provider. In at least one of the various embodiments, the OTP and UIDN may be provided to the identity authority in an identity verification request. In some embodiments, the provider may determine which identity authority to provide the OTP based on the credit request. For example, in one embodiment, a consumer may enter identity authority information on a credit request application. In some embodiments, such identity authority information may be obtained from the biometric smartcard. In one embodiment, the identity authority information may be stored on the biometric smartcard and may be accessible when an OTP is generated. In other embodiments, the identity authority information may be visibly printed on the biometric smartcard. In at least one of the various embodiments, the provider may provide the OTP and/or the UIDN to the identity authority through a secure means, such as, but not limited to, through a secured internet connection, or the like.

Process 600 then flows to decision block 608, where a determination is made whether the OTP is authentic. In some embodiments, the identity authority may generate an OTP to compare with the OTP received from the provider. In one embodiment, the identity authority may generate an OTP by a same algorithm used by the consumer's biometric smartcard. In another embodiment, the identity authority may receive a separate unique code from the biometric smartcard, which may be utilized to generate an OTP. In one such embodiment, the biometric smartcard may transmit the separate unique code to the identity authority when the biometric smartcard generates an OTP. In one embodiment, an OTP received from the provider may be authentic if it matches an OTP generated by the identity authority.

In at least one of the various embodiments, the OTP may not be authentic if an expiration time period of the OTP has ended. In one embodiment, an OTP may be valid for a predetermined period of time (i.e. expiration time period). If the OTP is not authenticated before the expiration time period ends, then the OTP may be determined to be unauthentic. If the OTP is authentic, then processing flows to block 610; otherwise, processing flows to block 612.

At block 610, the identity authority may provide a PVTN to the provider for the credit request. In one embodiment, the PVTN may be a unique number for the credit request. The PVTN may be utilized to prevent the consumer from later disputing the credit request and/or approved credit.

Process 600 then flows to block 614, where the provider requests a credit report for the consumer from a credit bureau. In some embodiments, the provider may request the consumer's credit report based on the UIDN. In other embodiments, the provider may resolve the UIDN into another identifier recognized by the credit bureau, such as, for example, the consumer's name and date of birth, social security number, credit bureau identification number, and/or the like. In some other embodiments, the provider may utilize the UIDN and PVTN to request the consumer's credit report. In some embodiments, requesting the credit report from a credit bureau may be optional and may not be performed. In one embodiment, the provider may internally maintain credit reports and/or credit ratings of consumers separate from credit bureaus.

The credit report may include a plurality of information about a credit history of the consumer. In one embodiment, the credit report may identify other approved and/or rejected credit requests. In another embodiment, the credit report may include an overall credit rating for the consumer. However, the invention is not so limited and the credit report may include other information about the consumer's credit history. In at least one embodiment, the provider may utilize the credit report to approve the credit request by determining if the consumer has an acceptable credit rating.

Continuing to decision block 616, a determination may be made whether the consumer has an acceptable credit rating. In one embodiment, decision block 616 may employ embodiments of decision block 507 of FIG. 5 to determine if the consumer has an acceptable credit rating. If the consumer has an acceptable credit rating, then processing flows to block 618; otherwise, processing flows to block 612.

At block 612, the requested credit may be rejected. In one embodiment, block 612 may employ embodiments of block 510 of FIG. 5 to reject the credit request. In some embodiments, the provider may provide a credit report update identifying the rejected credit request. In at least one of the various embodiments, the credit report update may include the UIDN and/or the PVTN. In one embodiment, the credit report update may indicate that the credit request was not authentic. In another embodiment, the credit report update may indicate that the consumer did not have an acceptable credit rating. In yet other embodiments, the credit report update may include other information as to why the credit request was rejected.

In some embodiments, the credit report update may be provided to one or more credit bureaus. In one embodiment, the credit bureau may store unauthentic credit requests (e.g. unauthentic OTPs) to help identify identity theft. For example, if a threshold number of unauthentic OTPs are provided to a provider for a consumer's UIDN, then the UIDN may be determined to be stolen. In other embodiments, the credit report update may be maintained by the provider. In some other embodiments, providing the credit report update to credit bureaus may be optional and may not be performed.

Processing then returns to a calling process to perform other actions.

If the consumer has an acceptable credit rating, then processing flows to block 618. At block 618, the provider may provide credit to the consumer. In at least one of the various embodiments, block 618 may employ embodiments of block 508 of FIG. 5 to provide credit to the consumer.

Process 600 next proceeds at block 620, where the provider may provide an update to the credit report for the consumer based on the approved credit. In some embodiments, the credit report update may be provided to one or more credit bureaus. In other embodiments, the credit report update may be maintained by the provider, separate from a credit bureau. In at least one of the various embodiments, the credit report update may include the UIDN and/or the PVTN. In some embodiments, the credit report update may indicate that the credit request was approved. In one embodiment, the credit report update may identity an amount of credit provided to the consumer. In some other embodiments, providing the credit report update to credit bureaus may be optional and may not be performed Processing then returns to a calling process to perform other actions.

Figure 7:
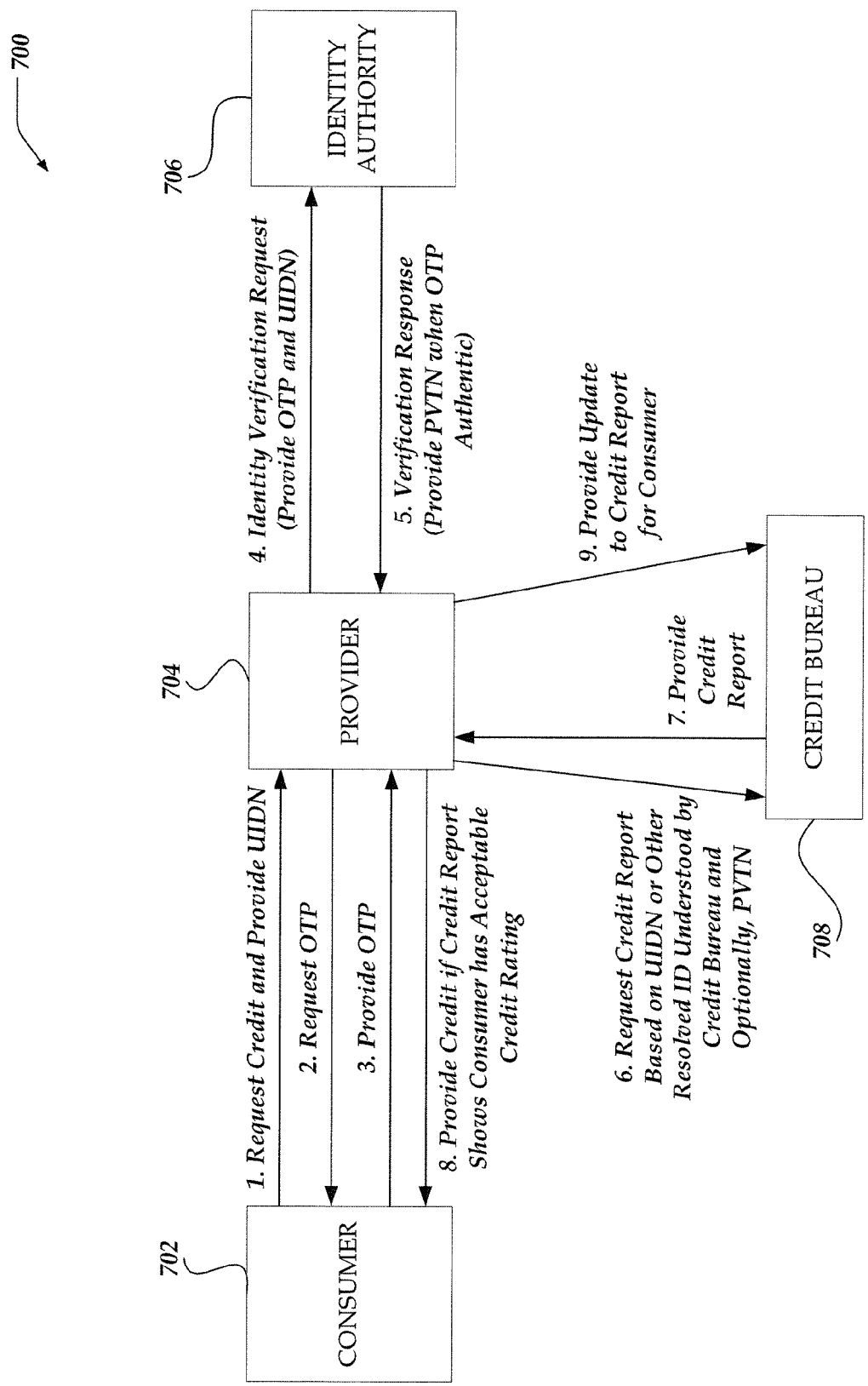
FIG. 7 shows one embodiment of a system for implementing a credit request authentication process such as that shown in FIG. 6.

FIG. 7 shows one embodiment of a system for implementing a credit request authentication process such as that shown in FIG. 6. System 700 may include consumer 702, provider 704, identity authority 706, and credit bureau 708. Consumer 702 may be a user of client devices 103-105, ATM device 102, or telephone/fax device 106 of FIG. 1. Provider 704 may be an embodiment of PSD 110 of FIG. 1. Identity authority 706 may be an embodiment of IASD 112 of FIG. 1. Credit bureau 708 may be an embodiment of CBSD 114 of FIG. 1. In some embodiments, credit bureau 708 may be optional and may not be utilized.

First, consumer 702 may provide a credit request to provider 704. The credit request may include a UIDN of consumer 702.

Second, provider 704 may request an OTP from consumer 702.

Third, consumer 702 may obtain an OTP generated from a biometric smartcard, such as biometric smartcard 200 of FIG. 2, and provide it to provider 704.

Fourth, provider 704 may send an identity verification request to identity authority 706 for the credit request. The identity verification request may include the OTP and UIDN received from consumer 702.

Fifth, identity authority 706 may authenticate the OTP and provide a verification response to provider 704. If the OTP is authentic, then the verification response may include a PVTN for the credit request. If the OTP is not authentic, then the verification response may indicate that credit request authentication for consumer 702 failed.

Sixth, provider 704 may utilize the UIDN or other resolved identifier understood by credit bureau 708 to request a credit report from credit bureau 708 for consumer 702. In one embodiment, provider 704 may utilize the PVTN to request a credit report from credit bureau 708 for consumer 702. In some embodiments, requesting a credit report from credit bureau 708 may be optional and may not be performed.

Seventh, credit bureau 708 may provide a credit report for consumer 702 to provider 704.

Eighth, provider 704 may provide credit to consumer 702 if the credit report shows consumer 702 has an acceptable credit rating. If consumer 702 has an unacceptable credit rating, then provider 704 may provide a credit request rejection to consumer 702.

Ninth, provider 704 may provide a credit report update for consumer 702 to credit bureau 708. The credit report update may indicate whether the credit request was approved or rejected by provider 704.

Figure 8:
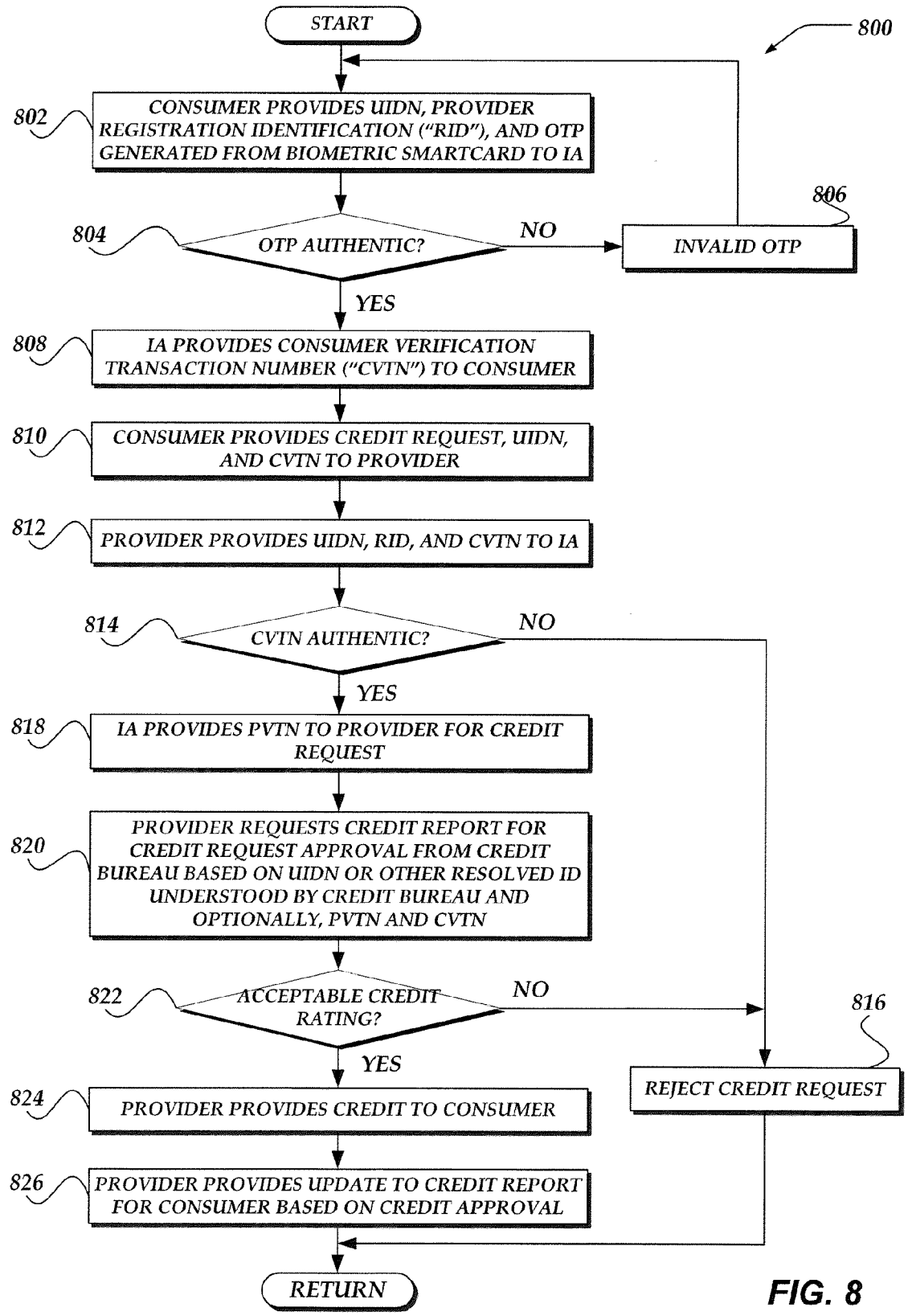
FIG. 8 illustrates a logical flow diagram generally showing an alternative embodiment of a process for utilizing an identity authority and a one-time-pin generated from a consumer biometric smartcard to authenticate a credit request for a consumer.

FIG. 8 illustrates a logical flow diagram generally showing one embodiment of a process for utilizing an identity authority and a one-time-pin generated from a consumer biometric smartcard to authenticate a credit request from a consumer. In some embodiments, process 800 or portions of process 800 of FIG. 8 may be implemented by and/or executed on one or more network devices, such as network device 300 of FIG. 3

Process 800 begins, after a start block, at block 602, where the consumer provides an OTP authentication request to an identity authority. In some embodiments, the identity authority may be a third party separate from the consumer and a provider. The OTP authentication request may include, but is not limited to, a UIDN for the consumer, an RID for a provider, and an OTP generated from a biometric smartcard of the consumer, or the like. In some embodiments, the OTP authentication request may include a PSN for a product and/or service which may utilize credit to purchase. In some embodiments, the consumer may request OTP authentication from the identity authority by telephone, facsimile, text-based message (e.g. SMS, email, or the like), paper mail, through an ATM device, or the like. In one embodiment, the OTP request may be provided to the identity authority through a secure means, such as, but not limited to, through a secured internet connection, or the like.

Process 800 continues at decision block 804, where a determination may be made whether the OTP is authentic. In one embodiment, decision block 804 may employ embodiments of decision block 608 of FIG. 6 to determine whether the OTP is authentic. If the OTP is authentic, then processing flows to block 808; otherwise, processing flows to block 806.

At block 806, the consumer may be notified that the OTP is invalid (i.e. unauthentic). In one embodiment, the identity authority may provide a text-based message (e.g. SMS, email, or the like), automated telephone message, paper mail, or the like, to the consumer indicating that the OTP was invalid. In some embodiments, the identity authority may provide a credit report update to a credit bureau with the consumer's UIDN to indicate that an invalid OTP was received. In one embodiment, a number of invalid OTPs above a predetermined threshold may indicate that the consumer's UIDN may have been stolen or otherwise used without the consumer authorization. Processing may loop to block 802 to receive another OTP from the consumer.

If the OTP is authentic, then process 800 flows to block 808. At block 808, the identity authority may provide a CVTN to the consumer. In one embodiment, the CVTN may be unique to the OTP and/or a credit request. In some embodiments, the identity authority may provide the CVTN to the consumer by text-based message (e.g. SMS, email, or the like), automated telephone message, paper mail, ATM device, or the like.

Process 800 proceeds to block 810, where the consumer provides a credit request to a provider. In one embodiment, the credit request may include a UIDN for the consumer and the CVTN from the identity authority. In at least one of the various embodiments, block 810 may employ embodiments of block 602 of FIG. 6 to request credit from a consumer.

Continuing at block 812, the provider provides the UIDN and the CVTN to the identity authority. In some embodiments, the provider may also provide an RID for the provider to the identity authority. In at least one of the various embodiments, the UIDN, RID, and/or CVTN may be provided to the identity authority as an identity verification request. In some embodiments, the identity verification request may include a PSN from the credit request. In one embodiment, the PSN may identify a product and/or service for which the requested credit may be applied. In at least one of the various embodiments, block 812 may employ embodiments of block 606 of FIG. 6 to provide an identity verification request to the identity authority.

Process 800 then flows to decision block 814, where a determination is made whether the CVTN is authentic. In one embodiment, the identity authority may compare the CVTN received from the provider with the CVTN generated and provided to the consumer (at block 808). In one embodiment, such a comparison may be performed by mapping the received UIDN to a CVTN provided to the consumer. In some embodiments, if the received CVTN matches the CVTN provided to the consumer, then the CVTN may be authentic. If the CVTN is authentic, then processing flows to block 818; otherwise, processing flows to block 816.

At block 818, the identity authority may provide a PVTN to the provider for the credit request. In at least one of the various embodiments, block 818 may employ embodiments of block 610 of FIG. 6 to provide a PVTN to the provider.

Process 800 continues at block 822, where the provider may request a credit report for credit request approval from a credit bureau. In some embodiments, the provider may request the consumer's credit report based on the UIDN. In other embodiments, the provider may resolve the UIDN into another identifier recognized by the credit bureau, such as, for example, the consumer's name and date of birth, social security number, credit bureau identification number, and/or the like. In some other embodiments, the credit report request may be based on the UIDN, CVTN, and/or PVTN. In some embodiments, requesting the credit report from a credit bureau may be optional and may not be performed. In at least one of the various embodiments, block 822 may employ embodiments of block 614 of FIG. 6 to request a credit report from a credit bureau.

In any event, process 800 proceeds to decision block 822, where a determination may be made whether the consumer has an acceptable credit rating. In at least one of the various embodiments, decision block 822 may employ embodiments of decision block 616 of FIG. 6 to determine whether the consumer has an acceptable credit rating.

If the consumer does not have an acceptable credit rating, then processing flows to block 816. At block 816, the credit request may be rejected. In at least one of the various embodiments, block 816 may employ embodiments of block 612 of FIG. 6 to reject the credit request.

If the consumer has an acceptable credit rating, then processing flows to block 824, where the provider provides credit to the consumer. In some embodiments, block 824 may employ embodiments of block 618 of FIG. 8 to provide credit to the consumer.

Process 800 next proceeds to block 826, where the provider provides an update to the credit report for the consumer based on the credit approval. In at least one of the various embodiments, block 822 may employ embodiments of block 620 of FIG. 6 to update a credit report for the consumer.

Process 800 then returns to a calling process to perform other actions.

Figure 9:
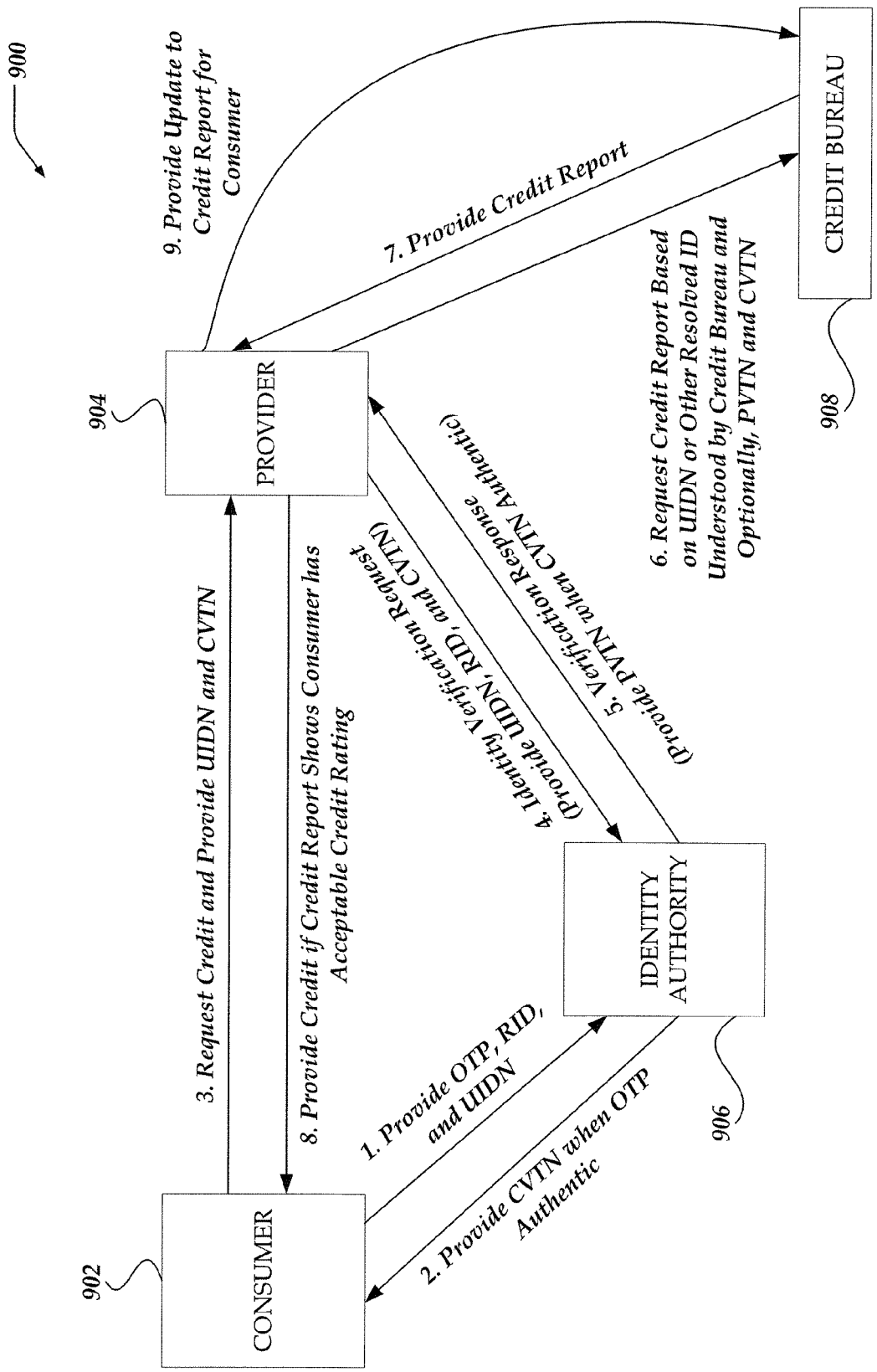
FIG. 9 shows one embodiment of a system for implementing a credit request authentication process such as that shown in FIG. 8.

FIG. 9 shows one embodiment of a system for implementing a credit request authentication process such as that shown in FIG. 8. System 900 may include consumer 902, provider 904, identity authority 906, and credit bureau 908. Consumer 902 may be a user of client devices 103-105, ATM device 102, or telephone/fax device 106 of FIG. 1. Provider 904 may be an embodiment of PSD 110 of FIG. 1. Identity authority 906 may be an embodiment of IASD 112 of FIG. 1. Credit bureau 908 may be an embodiment of CBSD 114 of FIG. 1. In some embodiments, credit bureau 908 may be optional and may not be utilized.

First, consumer 902 may obtain an OTP generated from a biometric smartcard, such as biometric smartcard 200 of FIG. 2, and provide it along with an RID and UIDN of consumer 902 to identity authority 906 for authentication.

Second, identity authority 906 may provide a CVTN to consumer 902 when the OTP is authentic. If the OTP is not authentic, then identity authority 906 may notify consumer 902 that the OTP authentication for consumer 902 failed.

Third, consumer 902 may provide a credit request to provider 904. The credit request may include a UIDN of consumer 702 and the CVTN received from identity authority 906.

Fourth, provider 904 may send an identity verification request to identity authority 906 for the credit request. The identity verification request may include the CVTN, RID, and UIDN received from consumer 902.

Fifth, identity authority 906 may authenticate the CVTN and provide a verification response to provider 904. If the CVTN is authentic, then the verification response may include a PVTN for the credit request. If the CVTN is not authentic, then the verification response may indicate that the credit request authentication for consumer 902 failed.

Sixth, provider 904 may utilize the UIDN or other resolved identifier understood by credit bureau 908 to request a credit report from credit bureau 908 for consumer 902. In one embodiment, provider 904 may utilize the CVTN and/or the PVTN to request a credit report from credit bureau 908 for consumer 902. In some embodiments, requesting a credit report from credit bureau 908 may be optional and may not be performed.

Seventh, credit bureau 908 may provide a credit report for consumer 902 to provider 904.

Eighth, provider 904 may provide credit to consumer 902 if the credit report shows consumer 902 has an acceptable credit rating. If consumer 902 has an unacceptable credit rating, then provider 904 may provide a credit request rejection to consumer 902.

Ninth, provider 904 may provide a credit report update for consumer 902 to credit bureau 908. The credit report update may indicate whether the credit request was approved or rejected by provider 904.

Figure 10:
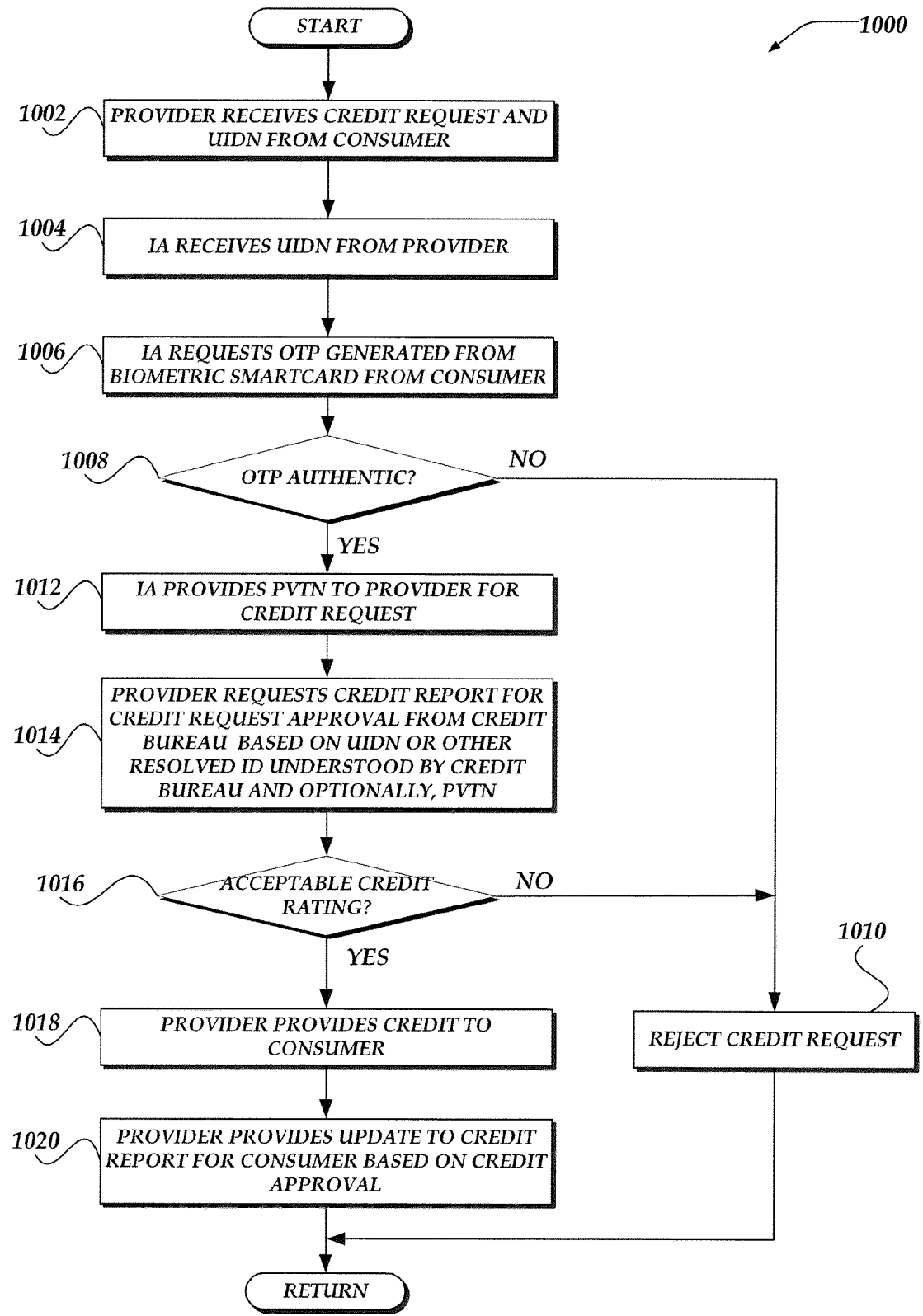
FIG. 10 illustrates a logical flow diagram generally showing an alternative embodiment of a process for utilizing an identity authority and a one-time-pin generated from a consumer biometric smartcard to authenticate a credit request for a consumer.

FIG. 10 illustrates a logical flow diagram generally showing one embodiment of a process for utilizing an identity authority and a one-time-pin generated from a consumer biometric smartcard to authenticate a credit request from a consumer. In some embodiments, process 1000 or portions of process 1000 of FIG. 10 may be implemented by and/or executed on one or more network devices, such as network device 300 of FIG. 3

Process 1000 begins, after a start block, at block 1002, where a provider may receive a credit request and UIDN from a consumer. In at least one of the various embodiments, block 1002 may employ embodiments of block 602 of FIG. 6 for receiving a credit request from a consumer.

Process 1000 continues at block 1004, where an identity authority receives the UIDN from the provider. In some embodiments, the identity authority may be a third party separate from the consumer and the provider. In some embodiments, the UIDN may be provided to the identity authority as an identity verification request. In at least one of the various embodiments, the identity verification request may be provided to the identity authority through a secure means, such as, but not limited to, a secure internet connection, or the like.

Proceeding to block 1006, the identity authority may requests an OTP generated from a biometric smartcard for the consumer. In some embodiments, block 1006 may employ embodiments of block 604 of FIG. 6 for requesting an OTP from a consumer. In such embodiments, the OTP may be requested from the consumer by the identity authority, rather than by the provider, as described by process 600 of FIG. 6.

Process 1000 next continues at decision block 1008, where a determination may be made whether an OTP received from the consumer is authentic. In one embodiment, decision block 1004 may employ embodiments of decision block 608 of FIG. 6 to determine whether the OTP is authentic. If the OTP is authentic, then processing flows to block 1012; otherwise, processing flows to block 1010.

At block 1012, the identity authority may provide a PVTN to the provider for the credit request. In at least one of the various embodiments, block 1012 may employ embodiments of block 610 of FIG. 6 to provide a PVTN to the provider.

Processing then flows to block 1014, where the provider may request a credit report for the consumer from a credit bureau. In some embodiments, the provider may request the consumer's credit report based on the UIDN. In other embodiments, the provider may resolve the UIDN into another identifier recognized by the credit bureau, such as, for example, the consumer's name and date of birth, social security number, credit bureau identification number, and/or the like. In some other embodiments, the provider may utilize the UIDN and PVTN to request the consumer's credit report. In some embodiments, requesting a credit report from the credit bureau may be optional and may not be performed. In one embodiment, the provider may internally maintain credit reports and/or credit ratings of consumers. In at least one of the various embodiments, block 1014 may employ embodiments of block 614 of FIG. 6 to request a credit report for the credit request.

Process 1000 next proceeds to decision block 1016, where a determination may be made whether the consumer has an acceptable credit rating. In some embodiments, decision block 1016 may employ embodiments of decision block 616 of FIG. 6 to determine whether the consumer has an acceptable credit rating.

If the consumer does not have an acceptable credit rating, then processing flows to block 1010. At block 1010, the credit request may be rejected. In at least one of the various embodiments, block 1010 may employ embodiments of block 612 of FIG. 6 to reject the credit request. Processing then returns to a calling process to perform other actions.

If the consumer has an acceptable credit rating, then processing flows to block 1018, where the provider provides credit to the consumer. In some embodiments, block 1018 may employ embodiments of block 618 of FIG. 8 to provide credit to the consumer.

Process 1000 next proceeds to block 1020, where the provider provides an update to the credit report for the consumer based on the credit approval. In at least one of the various embodiments, block 1020 may employ embodiments of block 620 of FIG. 6 to update a credit report for the consumer.

Process 800 then returns to a calling process to perform other actions.

Figure 11:
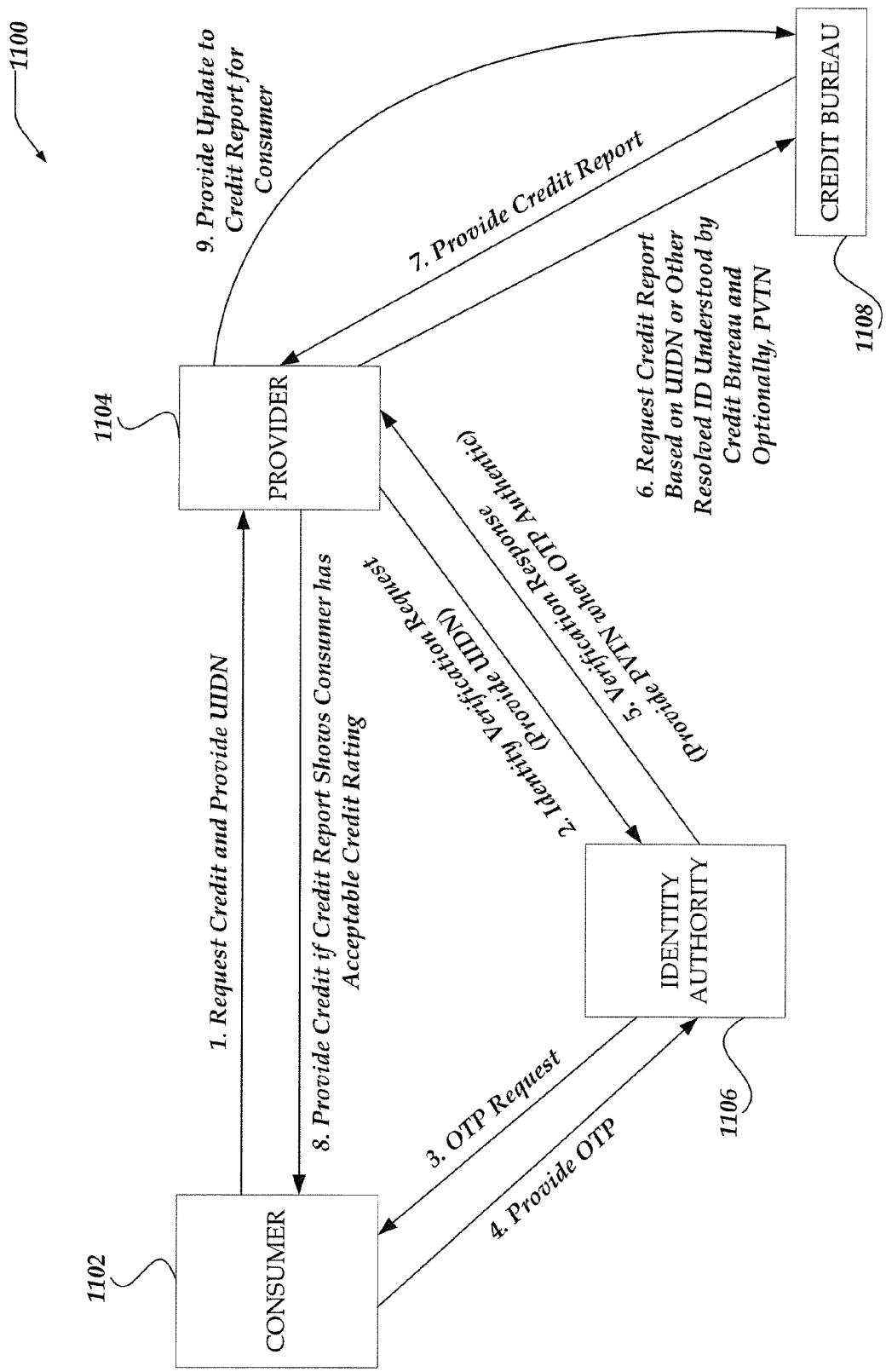
FIG. 11 shows one embodiment of a system for implementing a credit request authentication process such as that shown in FIG. 10.

FIG. 11 shows one embodiment of a system for implementing a credit request authentication process such as that shown in FIG. 10.

System 1100 may include consumer 1102, provider 1104, identity authority 1106, and credit bureau 1108. Consumer 1102 may be a user of client devices 103-105, ATM device 102, or telephone/fax device 106 of FIG. 1. Provider 114 may be an embodiment of PSD 110 of FIG. 1. Identity authority 1106 may be an embodiment of IASD 112 of FIG. 1. Credit bureau 1108 may be an embodiment of CBSD 114 of FIG. 1. In some embodiments, credit bureau 1108 may be optional and may not be utilized.

First, consumer 1102 may provide a credit request to provider 1104. The credit request may include a UIDN of consumer 1102.

Second, provider 1104 may send an identity verification request to identity authority 1106 for the credit request. The identity verification request may include the UIDN received from consumer 1102.

Third, identity authority 1106 may request an OTP from consumer 1102.

Fourth, consumer 1102 may obtain an OTP generated from a biometric smartcard, such as biometric smartcard 200 of FIG. 2, and provide it to identity authority 1106 for authentication.

Fifth, identity authority 1106 may authenticate the OTP and provide a verification response to provider 1104. If the OTP is authentic, then the verification response may include a PVTN for the credit request. If the OTP is not authentic, then the verification response may indicate that credit request authentication for consumer 1102 failed.

Sixth, provider 1104 may utilize the UIDN or other resolved identifier understood by credit bureau 1108 to request a credit report from credit bureau 1108 for consumer 1102. In one embodiment, provider 1104 may utilize the PVTN to request a credit report from credit bureau 1108 for consumer 1102. In some embodiments, requesting a credit report from credit bureau 1108 may be optional and may not be performed.

Seventh, credit bureau 1108 may provide a credit report for consumer 1102 to provider 1104.

Eighth, provider 1104 may provide credit to consumer 1102 if the credit report shows consumer 1102 has an acceptable credit rating. If consumer 1102 has an unacceptable credit rating, then provider 1104 may provide a credit request rejection to consumer 1102.

Ninth, provider 1104 may provide a credit report update for consumer 1102 to credit bureau 1108. The credit report update may indicate whether the credit request was approved or rejected by provider 1104.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for authenticating a consumer for a financial service from a provider with a network computer over a network, wherein the network computer includes a one or more processor devices that execute instructions to instantiate an identity authority application that performs actions, comprising:

employing the one or more processor devices to provide, at the provider, a request for the financial service from the consumer that is assigned to a biometric card and a unique identification number ("UIDN") that corresponds to the biometric card, wherein the biometric card includes one or more biometric templates of biometric information about the assigned consumer;

employing the one or more processor devices to employ the biometric card and biometric templates to sense physical signals of the consumer based on biometric information that is provided by the consumer to the biometric card, wherein the biometric card employs the sensed signals to determine an authenticity of biometric information about the consumer that is provided to the biometric card, wherein the sensed signals are configured and arranged for storage in a processor readable non-transitive storage media that is inside the biometric card, wherein the media is physically changed by the storing of the sensed signals which are employed to improve an ability of the biometric card to identify the consumer;

employing the one or more processor devices to provide at least the UIDN, received by the provider from the consumer, to the identity authority application that determines an authenticity of a one time pin ("OTP") provided by the consumer, wherein the OTP is generated by the biometric card based on at least affirmative authentication of the biometric information provided by the consumer, and wherein the biometric card is provided to the consumer by the identity authority application;

employing the one or more processor devices to affirmatively authenticate the OTP provided by the consumer with the identity authority application based on at least the UIDN;

based on at least the identity authority application affirmatively authenticating the OTP provided by the consumer, employing the one or more processor devices to employ the identity authority application to authorize the provider to provide the consumer with access to the financial service, wherein the OTP includes a time period to be authenticated by the identity authority application that is one minute or less; and employing the one or more processor devices to determine a credit rating of the consumer from at least an internal credit report maintained by the authorized provider separate from an external credit report about the consumer maintained by a credit bureau, wherein the authorized provider resolves the UIDN into another identifier of the consumer that is recognized by the credit bureau, wherein the authorized provider provides the consumer with access to the financial service when the consumer is determined to have a good credit rating from at least the internal credit report, and wherein the provider requests the external credit report about the consumer from the credit bureau based on both the biometric card authenticating the biometric information provided by the consumer and the identity authority application affirmatively authenticating the OTP provided by the consumer, wherein the provider's request to the credit bureau includes one or more of the UIDN, a consumer verification transaction number ("CVTN"), a provider verification transaction number ("PVTN"), or another identifier.

2. The method of claim 1, further comprising enabling the consumer to provide the OTP to the provider along with the UIDN and the request for financial services.

3. The method of claim 1, further comprising employing the provider to request and receive the OTP from the consumer after the provider receives the request for financial services.

4. The method of claim 1, further comprising employing the identity authority application to request and receive the OTP after the provider receives the request for financial services.

5. The method of claim 1, further comprising:

employing the identity authority application to receive the OTP from the consumer prior to the provider receiving the request;

employing the identity authority application to provide a consumer verification transaction number ("CVTN") to the consumer based on an affirmative authentication of the OTP;

employing the provider to receive the CVTN from the consumer;

employing the provider to provide the CVTN to the identity authority application; and employing the identity authority application to authorize the provider to provide the consumer with access to the financial service based on the identity authority application's affirmative authentication of the CVTN provided by the consumer.

6. The method of claim 1, wherein the biometric information about the consumer includes at least one of a fingerprint, a facial image, and an image of an iris in an eye of the consumer.

7. The method of claim 1, wherein the provider requests for the external credit report about the consumer from the credit bureau based on one or more of the UIDN and the consumer verification transaction number ("CVTN"), and the provider verification transaction number ("PVTN"), or the other identifier, further comprises the other identifier including one or more of the consumer's name, date of birth, social security number, or credit bureau identification number.

8. The method of claim 1, wherein the OTP is communicated to the identity authority application by at least one of a telephone call, a fax, a physical letter, an electronic message, and a website.

9. A system for authenticating a consumer for a financial service from a provider device over a network, comprising:
a biometric card that is provided to the consumer and is operative to capture and determine an authenticity of biometric information about the consumer; and
a network device, including:
a memory for storing instructions; and
one or more processors that execute the instructions to instantiate an identity authority application to perform actions, comprising:
employing the one or more processor devices to provide, at the provider, a request for the financial service from the consumer that is assigned to the biometric card and a unique identification number ("UIDN") that corresponds to the biometric card, wherein the biometric card includes one or more biometric templates of biometric information about the assigned consumer;
employing the one or more processor devices to employ the biometric card and biometric templates to sense physical signals of the consumer based on biometric information that is provided by the consumer to the biometric card, wherein the biometric card employs the sensed signals to determine an authenticity of biometric information about the consumer that is provided to the biometric card, wherein the sensed signals are configured and arranged for storage in a processor readable non-transitive storage media that is inside the biometric card, wherein the media is physically changed by the storing of the sensed signals which are employed to improve an ability of the biometric card to identify the consumer;
employing the one or more processor devices to provide at least the UIDN, received by the provider from the consumer, to the identity authority application that determines an authenticity of a one time pin ("OTP") provided by the consumer, wherein the OTP is generated by the biometric card based on at least affirmative authentication of the biometric information provided by the consumer, and wherein the biometric card is provided to the consumer by the identity authority application;
employing the one or more processor devices to affirmatively authenticate the OTP provided by the consumer with the identity authority application based on at least the UIDN;
based on at least the identity authority application affirmatively authenticating the OTP provided by the consumer, employing the one or more processor devices to employ the identity authority application to authorize the provider to provide the consumer with access to the financial service, wherein the OTP includes a time period to be authenticated by the identity authority application that is one minute or less; and
employing the one or more processor devices to determine a credit rating of the consumer from at least an internal credit report maintained by the authorized provider separate from an external credit report about the consumer maintained by a credit bureau, wherein the authorized provider resolves the UIDN into another identifier of the consumer that is recognized by the credit bureau, wherein the authorized provider provides the consumer with access to the financial service when the consumer is determined to have a good credit rating from at least the internal credit report, and wherein the provider requests the external credit report about the consumer from the credit bureau based on both the biometric card authenticating the biometric information provided by the consumer and the identity authority application affirmatively authenticating the OTP provided by the consumer, wherein the provider's request to the credit bureau includes one or more of the UIDN, a consumer verification transaction number ("CVTN"), a provider verification transaction number ("PVTN"), or another identifier.

10. The system of claim 9, wherein the actions further comprise enabling the consumer to provide the OTP to the provider along with the UIDN and the request for financial services.

11. The system of claim 9, wherein the actions further comprise employing the provider to request and receive the OTP from the consumer after the provider receives the request for financial services.

12. The system of claim 9, wherein the actions further comprise employing the identity authority application to request and receive the OTP after the provider receives the request for financial services.

13. The system of claim 9, wherein the actions further comprise:
employing the identity authority application to receive the OTP from the consumer prior to the provider receiving the request;
employing the identity authority application to provide a consumer verification transaction number ("CVTN") to the consumer based on an affirmative authentication of the OTP;
employing the provider to receive the CVTN from the consumer;
employing the provider to provide the CVTN to the identity authority application; and
employing the identity authority application to authorize the provider to provide the consumer with access to the financial service based on the identity authority application's affirmative authentication of the CVTN provided by the consumer.

14. The system of claim 9, wherein the biometric information about the consumer includes at least one of a fingerprint, a facial image, and an image of an iris in an eye of the consumer.

15. The system of claim 9, wherein the provider requests for the credit report about the consumer from the credit bureau based on one or more of the UIDN, a consumer verification transaction number ("CVTN"), a provider verification transaction number ("PVTN"), or the other identifier, further comprises the other identifier including one or more of the consumer's name, date of birth, social security number, or credit bureau identification number.

16. The system of claim 9, wherein the OTP is communicated to the identity authority application by at least one of a telephone call, a fax, a physical letter, an electronic message, and a website.

17. A processor readable non-transitory storage media that includes instructions for authenticating a consumer for a financial service from a provider over a network, wherein the execution of the instructions by one or more processors instantiates an identity authority application that performs actions, comprising:

employing the one or more processor devices to provide, at the provider, a request for the financial service from the consumer that is assigned to a biometric card and a unique identification number ("UIDN") that corresponds to the biometric card, wherein the biometric card includes one or more biometric templates of biometric information about the assigned consumer;

employing the one or more processor devices to employ the biometric card and biometric templates to sense physical signals of the consumer based on biometric information that is provided by the consumer to the biometric card, wherein the biometric card employs the sensed signals to determine an authenticity of biometric information about the consumer that is provided to the biometric card, wherein the sensed signals are configured and arranged for storage in a processor readable non-transitive storage media that is inside the biometric card, wherein the media is physically changed by the storing of the sensed signals which are employed to improve an ability of the biometric card to identify the consumer;

employing the one or more processor devices to provide at least the UIDN, received by the provider from the consumer, to the identity authority application that determines an authenticity of a one time pin ("OTP") provided by the consumer, wherein the OTP is generated by the biometric card based on at least affirmative authentication of the biometric information provided by the consumer, and wherein the biometric card is provided to the consumer by the identity authority application;

employing the one or more processor devices to affirmatively authenticate the OTP provided by the consumer with the identity authority application based on at least the UIDN;

based on at least the identity authority application affirmatively authenticating the OTP provided by the consumer, employing the one or more processor devices to employ the identity authority application to authorize the provider to provide the consumer with access to the financial service, wherein the OTP includes a time period to be authenticated by the identity authority application that is one minute or less; and employing the one or more processor devices to determine a credit rating of the consumer from at least an internal credit report maintained by the authorized provider separate from an external credit report about the consumer maintained by a credit bureau, wherein the authorized provider resolves the UIDN into another identifier of the consumer that is recognized by the credit bureau, wherein the authorized provider provides the consumer with access to the financial service when the consumer is determined to have a good credit rating from at least the internal credit report, and wherein the provider requests the external credit report about the consumer from the credit bureau based on both the biometric card authenticating the biometric information provided by the consumer and the identity authority application affirmatively authenticating the OTP provided by the consumer, wherein the provider's request to the credit bureau includes one or more of the UIDN, a consumer verification transaction number ("CVTN"), a provider verification transaction number ("PVTN"), or another identifier.

18. The media of claim 17, further comprising enabling the consumer to provide the OTP to the provider along with the UIDN and the request for financial services.

19. The media of claim 17, further comprising employing the provider to request and receive the OTP from the consumer after the provider receives the request for financial services.

20. The media of claim 17, further comprising employing the identity authority application to request and receive the OTP after the provider receives the request for financial services.

21. The media of claim 17, further comprising:

employing the identity authority application to receive the OTP from the consumer prior to the provider receiving the request;

employing the identity authority application to provide a consumer verification transaction number ("CVTN") to the consumer based on an affirmative authentication of the OTP;

employing the provider to receive the CVTN from the consumer;

employing the provider to provide the CVTN to the identity authority application; and employing the identity authority application to authorize the provider to provide the consumer with access to the financial service based on the identity authority application's affirmative authentication of the CVTN provided by the consumer.

* * * * *